(12) United States Patent
Ramamurthy et al.

(10) Patent No.: US 12,368,531 B2
(45) Date of Patent: Jul. 22, 2025

(54) PLACEMENT OF REPAIR PACKETS IN MULTIMEDIA DATA STREAMS

(71) Applicant: ITTIAM SYSTEMS (P) LTD., Karnataka (IN)

(72) Inventors: Shailesh Ramamurthy, Bangalore (IN); Swapan Kumar Kundu, Bangalore (IN); Murali Babu Muthukrishnan, Bangalore (IN); Arunkumar Mohananchettiar, Bangalore (IN)

(*) Notice: Subject to any disclaimer, the term of this patent is extended or adjusted under 35 U.S.C. 154(b) by 0 days.

(21) Appl. No.: 17/795,563

(22) PCT Filed: Jun. 24, 2022

(86) PCT No.: PCT/IN2022/050579
§ 371 (c)(1),
(2) Date: Jul. 27, 2022

(87) PCT Pub. No.: WO2022/269642
PCT Pub. Date: Dec. 29, 2022

(65) Prior Publication Data
US 2025/0096938 A1    Mar. 20, 2025

(30) Foreign Application Priority Data
Jun. 25, 2021    (IN) .............................. 202141028713

(51) Int. Cl.
H04L 1/00    (2006.01)

(52) U.S. Cl.
CPC .......... H04L 1/0076 (2013.01); H04L 1/0041 (2013.01); H04L 1/0071 (2013.01)

(58) Field of Classification Search
CPC ... H04L 1/0076; H04L 1/0041; H04L 1/0045; H04L 1/0071; H03M 13/13; H03M 13/2903
See application file for complete search history.

(56) References Cited

U.S. PATENT DOCUMENTS

2017/0013065 A1*  1/2017  Ho ......................... H04L 1/1858
2019/0044645 A1*  2/2019  Chen ..................... H04L 1/0045
2022/0166545 A1*  5/2022  Ho ......................... H03M 13/13

* cited by examiner

Primary Examiner — Shelly A Chase
(74) Attorney, Agent, or Firm — Prakash Nama; Global IP Services, PLLC

(57) ABSTRACT

In an example, a method for delivering a multimedia data stream includes determining a frequency for generating one or more repair packets and a placement for positioning the one or more repair packets in the multimedia data stream based on a configuration parameter related to the multimedia data stream. The frequency and the placement may be determined based on a priority derived from a multimedia delivery use-case. Further, the method includes generating the one or more repair packets by network coding source packets of the multimedia data stream based on the determined frequency and the placement and transmitting the network coded multimedia data stream with the repair packets to a receiving device.

34 Claims, 25 Drawing Sheets

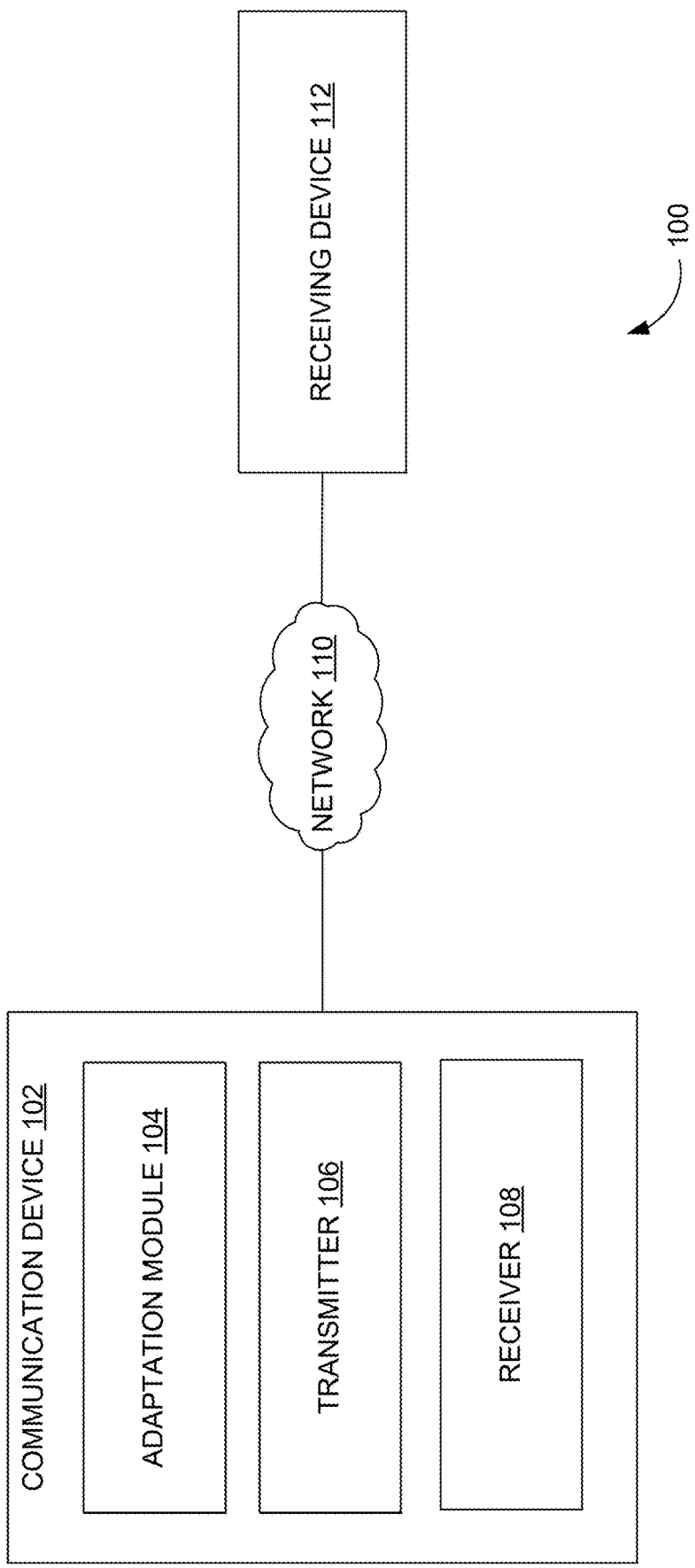

PLACEMENT OF REPAIR PACKETS IN MULTIMEDIA DATA STREAMS

TECHNICAL FIELD

The present disclosure relates to streaming of multimedia content, and more particularly to methods, techniques, and systems for generating and placing repair packets in source packets of a multimedia data stream.

BACKGROUND

With increasing user requirements for wireless multimedia services, the development of the communication technologies for efficient utilization of wireless resources may be promoted. The birth of 3G, B3G, and 4G standards brings along the proposals of various advanced wireless techniques, which makes the spectrum efficiency per link approach a theoretical limit. To improve the effective data rate in a network (e.g., a heterogeneous network), a network coding technique is introduced in the network, which may improve both the system capacity and the effective data rate via multi-point coordination. The network coding technique may be a super set of routing techniques, which allows for the coding and combination of the information from different links. Further, the network coding endeavors optimization of network throughput and flexibility in error correcting capabilities.

BRIEF DESCRIPTION OF THE DRAWINGS

FIG. 1A is a block diagram of an example system, depicting a communication device for delivering a multimedia data stream including repair packets to a receiving device;

Figure 1B:
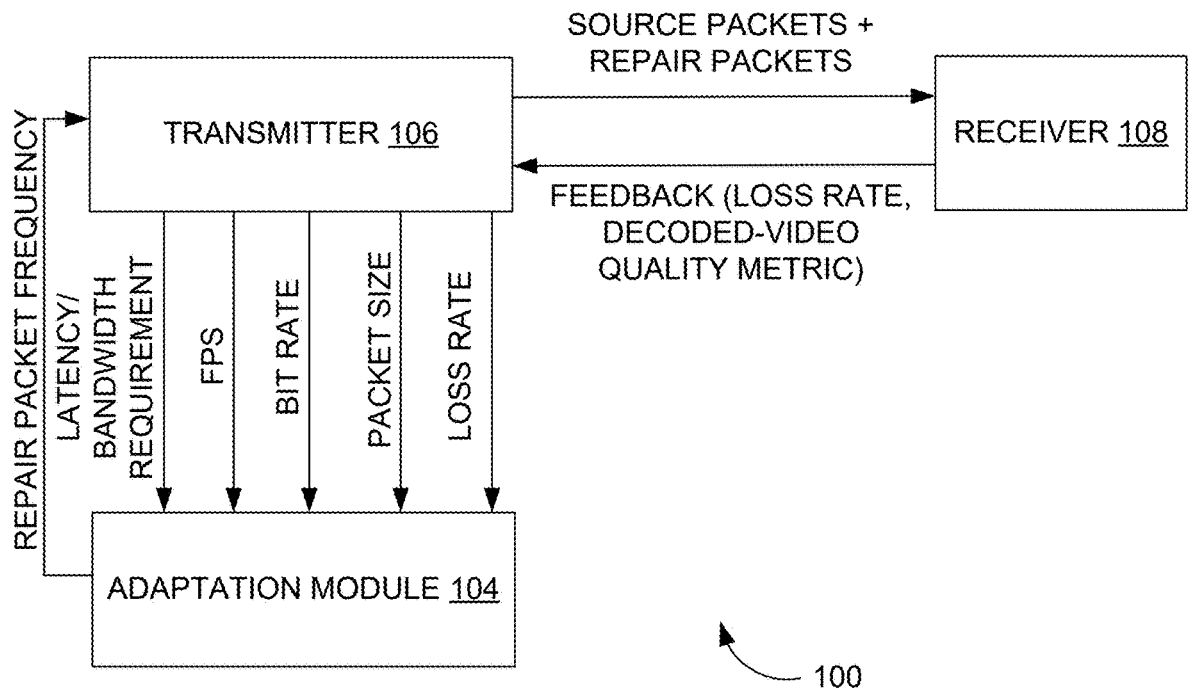
FIG. 1B is a block diagram of example system of FIG. 1A, depicting a placement of adaptation module for determining the frequency for generating repair packets and the placement for positioning the repair packets.

The drawings described herein are for illustration purposes only and are not intended to limit the scope of the present subject matter in any way.

DETAILED DESCRIPTION

Network coding (NC) is characterized by coding of incoming packets, by the nodes of a network, instead of the nodes relaying the packets. Further, an encoding operation is performed based on algebraic principles. The network coding may allow for error correction, optimizes bandwidth usage, and makes eavesdropping unsuccessful. The network coding may be characterized by mechanisms for encoding of incoming original data packets at a sender node, recoding of already coded packets by other nodes of the network, and decoding of the coded packets at a receiver. In an example linear network coding, the nodes may perform linear transformations and combinations to the data flowing into them.

While source coding (e.g., video or audio compression) or channel coding (e.g., which introduces redundancies using fixed block codes, for detecting and correcting bit errors) are carried out in a point to point (e.g., sender to receiver) context, the network coding may operate in a distributed paradigm of complex network configurations (e.g., a multi-hop, a multipath, a multi-source/destination, or the like) and uses state of art codes such as RaptorQ codes or random linear codes. Network coding, such as Random Linear Network Coding (RLNC), has the properties of flexible error correction and optimization of information flow in the network.

In the RLNC, the nodes can transmit random linear combinations of the packets they receive, with coding coefficients chosen from a Galois field, for instance. In this example, the original packets are combined by means of random coefficients of the 'alpha' matrix to yield the coded packets. The coded packets are thus random linear combinations of original packets. In the example shown below, the coded packets are formed as a combination of original packets.

| Coded packets | Coding Coefficients |  |  |  |  |  | Original packets |
|---|---|---|---|---|---|---|---|
| $C_1$ | $\alpha_{1,1}$ | $\alpha_{1,1}$ | $\alpha_{1,3}$ | $\alpha_{1,4}$ | $\alpha_{1,5}$ | $\alpha_{1,6}$ | $P_1$ |
| $C_2$ | $\alpha_{2,1}$ | $\alpha_{2,2}$ | $\alpha_{2,3}$ | $\alpha_{2,4}$ | $\alpha_{2,5}$ | $\alpha_{2,6}$ | $P_2$ |
| $C_3$ = | $\alpha_{3,1}$ | $\alpha_{3,2}$ | $\alpha_{3,3}$ | $\alpha_{3,4}$ | $\alpha_{3,5}$ | $\alpha_{3,6}$ | $P_3$ |
| $C_4$ | $\alpha_{4,1}$ | $\alpha_{4,2}$ | $\alpha_{4,3}$ | $\alpha_{4,4}$ | $\alpha_{4,5}$ | $\alpha_{4,6}$ | $P_4$ |
| $C_5$ | $\alpha_{5,1}$ | $\alpha_{5,2}$ | $\alpha_{5,3}$ | $\alpha_{5,4}$ | $\alpha_{5,5}$ | $\alpha_{5,6}$ | $P_5$ |
| $C_6$ | $\alpha_{6,1}$ | $\alpha_{6,2}$ | $\alpha_{6,3}$ | $\alpha_{6,4}$ | $\alpha_{6,5}$ | $\alpha_{6,6}$ | $P_6$ |

For a sufficiently large field, the probability that the receiver(s) obtains linearly independent combinations may approach 1. However, if a receiver obtains an insufficient number of packets, the original packets may not be effectively recovered. In such a scenario, an encoder at the sender may send additional random linear combinations until the receiver obtains the appropriate number of packets. For example, 'G' original packets are combined into 'K' coded packets, where K>G. As shown above, RLNC as a rate less code, can output any number of output packets.

$$\begin{pmatrix} C_1 \\ \vdots \\ C_G \\ C_{G+1} \\ \vdots \\ C_K \end{pmatrix} = \begin{pmatrix} \alpha_{1,1} & \cdots & \alpha_{1,G} \\ \vdots & \ddots & \vdots \\ \alpha_{G,1} & \cdots & \alpha_{G,G} \\ \alpha_{G+1,1} & \cdots & \alpha_{G+1,G} \\ \vdots & \ddots & \vdots \\ \alpha_{K,1} & \cdots & \alpha_{K,G} \end{pmatrix} \begin{pmatrix} P_1 \\ \vdots \\ P_G \end{pmatrix}$$

Further, the network coding may facilitate in optimizing information flow and bandwidth aspects in a network having shared links or bottlenecks. For example, consider 'S1' and 'S2' as two source nodes that have information 'x1' and 'x2' to be transmitted to destination nodes 'R1' and 'R2', each of which want to receive both 'x1' and 'x2'. In an example routing scheme, a central link between the source nodes and the destination nodes (e.g., 'AB') would be only able to carry 'x1' or 'x2' at a time, but not both. The network coding uses algebraic principles to transmit a combination of 'x1' and 'x2'. For example, 'x1' and 'x2' can be combined using 'x3'='x1' xor 'x2'. In this example, 'R1' receives 'x1' and 'x3' readily, 'x3' at 'R1' when xor-ed with 'x1' yields 'x2'.

Thus, 'R1' receives both 'x1' and 'x2'. Similarly, 'R2' receives both 'x1' and 'x2' as well.

In some examples, the RLNC can be operated as a normal block coding scheme. In such a mechanism, the scheme takes a block of a fixed number of packets (e.g., three packets) each time and codes them. The block-based methodology is akin to traditional channel coding schemes such as Reed Solomon coding. The network coding can operate on the same block-based paradigm, bringing its advantages due to the algebraic processing at nodes. Further, traditional block codes are associated with latency. A certain number of fixed incoming packets have to be waited for, in order to generate the coded packets, which are transmitted to the decoder, which then decodes the coded packets associated with the block. In other examples, the network coding can also work on the fly, on the packets as they come in, to engender a sliding window encoding mechanism. In this example, the network coding can combine packets in an intelligent manner without increasing latency.

In the examples described herein, an advanced video coding (AVC) multimedia data stream (e.g., a video AVC (H.264)) has been considered to depict a problem space and a solution space. Further, example average size in bytes (e.g., from Elecard stream analyzer) for a 1080p video is considered as below.

| I frames | 76930 bytes |
|---|---|
| P frames | 19910 bytes |
| B frames | 5600 bytes |

Further, average sizes holding across the constituent frames of an example GOP of I P1 B1 B2 B3 B4 P2 B5 B6 B7 may be considered. The same logic may hold good even if different sizes for P1 and P2, as well as different sizes for each of the B frames are considered.

Assuming MTU of 1500, number of packets for I, P and B is 52, 14, and 4, respectively. Furthermore, consider that the network coding (e.g., RLNC) induces repair packets at regular intervals, without any notion of video syntax element (e.g., a frame, a slice, or the like) boundaries. Also, consider that one repair packet is generated for every 20 video packets as shown in FIG. 12A.

Figure 12A:
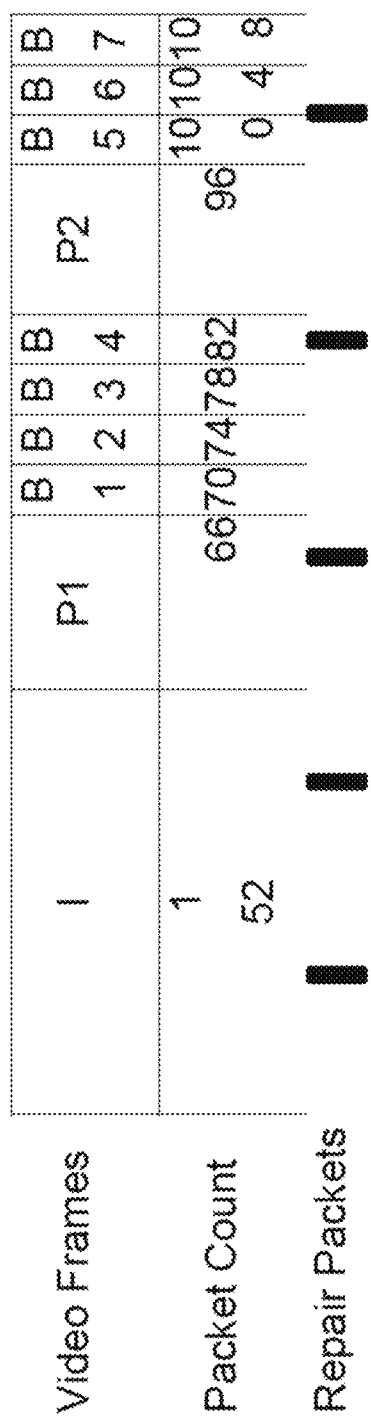
FIG. 12A depicts example I, P, and B frames, in which one repair packet is generated for every 20 video packets.

In the example shown in FIG. 12A, the repair packet for P1 is sent with a latency of 4 frames (i.e., a repair packet of P1 sent along with B4 picture's video packets). Similarly, the repair packet for B1 is sent with a latency of 3 frames (i.e., repair packet of B1 is sent along with B4 picture's video packets). Thus, if P1 picture were lost, there is a minimum latency of 4 frames in recovering it with the help of repair packet. If B1 picture were lost, there is a minimum latency of 3 frames in recovering it.

Figure 12B:
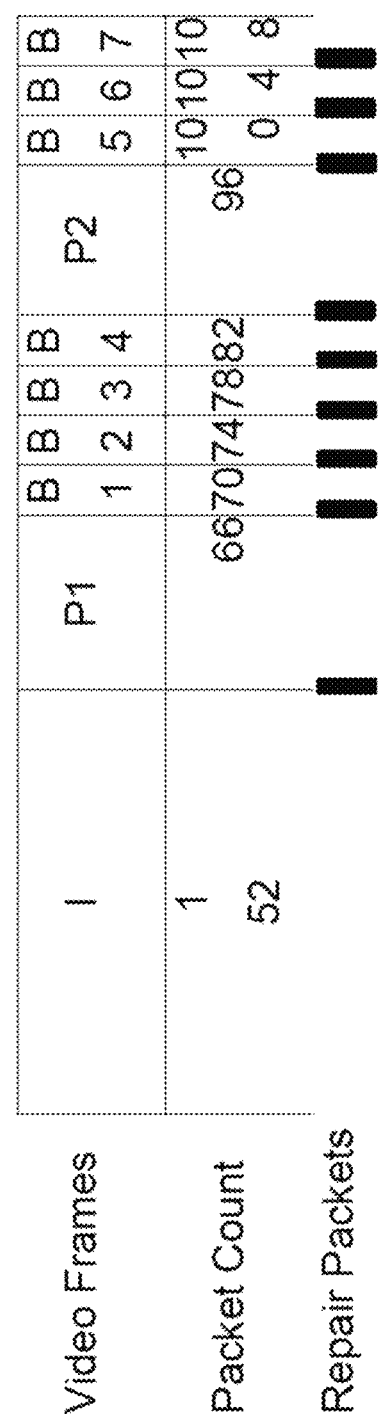
FIG. 12B depicts example I, P, and B frames, in which repair packets are sent at the end of every video frame.

In this example, if we sent the repair packets at the end of every video frame, theoretically the latency is only 1 frame as shown in FIG. 12B.

In a practical scenario, the repair packets also can be lost. Hence, the latency may exceed the theoretical latency. There can be other adaptations of this basic mechanism. In an example end-of-slice repair packet, a video frame can include multiple slices, each slice including contiguous macroblocks. For even lower latencies, the repair packets can be placed at the end of each slice as well. The term 'picture' may be used to cover the notion of frames as well as slices. In an example subsampling of end-of-picture scheme, placement of repair packets at the end of every picture could prove costly in terms of the bandwidth overheads induced due to the number of repair packets added.

These effects could be pronounced in case of low-bitrate contents. In order to alleviate the said overhead, schemes that subsample the end-of-picture repair packets could be employed advantageously. This would increase latency marginally, compared to placing repair packets at the end of every picture. However, this would still perform better than the 'naïve' RLNC described as the problem space. For instance, the repair packets can be appropriately paced as also placed at the end of every frame, every other frame, after n frames, and the like depending on the bandwidth overhead permissible.

Further, unequal protection schemes can also help in finding sweet spot between latency versus bandwidth-overhead. For instance, I and P slices/frames can be protected using the network coding, while B frames can be left unprotected (since no other frames typically depend on B frames, except in special configurations such as hierarchical B frames).

In an example metadata manifest for video-awareness when encryption/DRM is enabled, it can be noted that content-aware schemes primarily require the sizes of frames (i.e., in terms of number of bytes after video compression). Even in cases where premium content has been protected using the DRM or other content-protection schemes (e.g., resulting in encrypted packets passing over the network), the frame-aware techniques can work with a metadata information created during content creation/encoding. The metadata contains the sizes of frames of video. This information need not be encrypted since high value content cannot be reconstructed by merely using such metadata.

Hence, in order to minimize latency, repair packets can be inserted at frame or slice boundaries. For example, repair packets may be placed at the end of every frame (i.e., 1EOF), every alternate frame (i.e., 2EOF), every third frame (i.e., 3EOF) depending on the budget for overheads due to repair packets as well as a target latency (i.e., a given latency). Within each one of these example scenarios, repair packets can further be introduced by the fixed-frequency-of-interleave mechanism or by introducing them selectively within frames that have a large number of compressed bytes (e.g., 'large frame' or LRGF). Large frame definition used in the simulation setup may use an empirical formula to arrive at classification of 'large frames' such as:

$$\text{"if (source frame size/packet size)} > (1/(\text{repair packet frequency})),$$

$$\text{then large frame = TRUE".}$$

Thus, even though the network coding endeavors optimization of network throughput and flexibility in capabilities, problem-space of application for the multimedia data stream (e.g., digital-video) in a content-aware manner in terms of joint optimization of latency and bandwidth optimization (i.e., which may tend to pull the design in opposite directions) has not been addressed.

Examples described herein may provide a communication device for delivering a multimedia data stream with repair packets. The communication device may receive a configuration parameter related to the multimedia data stream. Further, the communication device may determine a frequency for generating one or more repair packets and a placement for positioning the one or more repair packets in the multimedia data stream based on the configuration parameter. The frequency and the placement may be determined based on a priority derived from a multimedia delivery use-case. Furthermore, the communication device may generate the one or more repair packets by network coding source packets of the multimedia data stream based on the determined frequency and the placement. Upon performing the network coding, the communication device may transmit the network coded multimedia data stream with the repair packets to a receiving device.

Examples described herein provides flexibility in pacing and placing the repair packets, and also enable the goal of joint optimization of latency and bandwidth overheads, in a manner that is sensitive to loss characteristics as well as the multimedia data stream. Further, examples described herein uses an adaptation algorithm for pacing and placing the repair packets, in a loss-aware and content-aware manner.

In the following description, for purposes of explanation, numerous specific details are set forth to provide a thorough understanding of the present techniques. However, the example apparatuses, devices, and systems, may be practiced without these specific details. Reference in the specification to "an example" or similar language means that a particular feature, structure, or characteristic described may be included in at least that one example but may not be in other examples.

Turning now to the figures, FIG. 1A is a block diagram of an example system 100, depicting a communication device 102 for delivering a multimedia data stream including repair packets to a receiving device 112. Example system 100 may include communication device 102 and receiving device 112 communicatively connected via a network 110. For example, communication device 102 may be a hardware device capable of delivering the multimedia data stream to receiving device 112 via network 110. The multimedia data stream may include audio/video (AV) content such as digital television programs, movies, or any multimedia content capable of being delivered over network 110. Example network 110 can be a managed Internet protocol (IP) network administered by a service provider. In recent years, over-the-top (OTT) and content delivery networks (CDN) have revolutionized the way multimedia is being delivered and consumed. The OTT systems or networks deliver the multimedia content (audio, video, and other related media and metadata content) over the Internet networks or cellular networks. The OTT may function independently by exclusively held or tightly controlled broadcast networks such as cable or satellite television networks. The OTT may bypass multiple-system operators (MSO), who were in exclusive control or distribution of the content before the advent of OTT. A content delivery network (CDN) aims to speed up the delivery of internet media and web content. The CDN may include a group of geographically distributed servers and data centers. Content is cached so that user requests for internet content can be delivered quickly using a server closer to the requesting client.

For example, network 110 may be implemented using wireless protocols and technologies, such as Wi-Fi, WiMax, and the like. In other examples, network 110 can also be a packet-switched network such as a local area network, wide area network, metropolitan area network, Internet network, or other similar type of network environment. In yet other examples, network 110 may be a fixed wireless network, a wireless local area network (LAN), a wireless wide area network (WAN), a personal area network (PAN), a virtual private network (VPN), intranet or other suitable network system and includes equipment for receiving and transmitting signals.

As shown in FIG. 1A, communication device 102 may include an adaptation module 104, a transmitter 106, and a receiver 108, which are communicatively connected to each other. Adaptation module 104 may receive a set of configuration parameters related to the multimedia data stream. An example configuration parameter may include a data rate of the multimedia data stream, a bit rate of the multimedia data stream, a frame rate of the multimedia data stream, a packet size, a repair packet size, a target latency, a target bandwidth, a packet loss rate between communication device 102 and receiving device 112, or any combination thereof. Further, adaptation module 104 may determine a frequency for generating one or more repair packets and a placement for positioning the one or more repair packets in the multimedia data stream based on the set of configuration parameters. The repair packets may be used to detect and correct errors when the multimedia data stream is transmitted from communication device 102 to receiving device 112. An error correction packet is a packet having information for recovering lost data packets of the multimedia data stream. Further, the repair packets may be used to combine input packets in the multimedia data stream. An example of the error correction packet is an FEC (forward-error correction) packet. In an example, the frequency and the placement may be determined based on a priority derived from a multimedia delivery use-case.

In an example, adaptation module 104 may generate a mapping function between a data rate of the multimedia data stream, a bit rate of the multimedia data stream, a frame rate of the multimedia data stream, a packet loss rate between the transmitting device and the receiving device, a repair packet size, a target latency, a target bandwidth, an upper bound on an encoding complexity, and an upper bound on a decoding complexity. For example, adaptation module 104 may generate the mapping function by applying a machine learning model to the data rate of the multimedia data stream, the bit rate of the multimedia data stream, the frame rate of the multimedia data stream, the packet loss rate, the repair packet size, the target latency, the target bandwidth, the upper bound on encoding complexity, and the upper bound on decoding complexity based on the priority. The machine learning model may be selected from models across big data involving various network coding configurations and multimedia data streams. Further, adaptation module 104 may determine the frequency for generating the one or more repair packets and the placement for positioning the one or more repair packets by optimizing one or more of a latency, a bandwidth, an encoding complexity, and a decoding complexity based on the mapping function.

Further, transmitter 106 may generate the one or more repair packets by network coding source packets of the multimedia data stream based on the determined frequency and the placement. In an example, transmitter 106 may compute a bandwidth overhead for placing the one or more repair packets for a given latency based on the priority between a bandwidth and a latency. Further, transmitter 106 may determine the placement for positioning the one or more repair packets at an end of an integral number of pictures based on the computed bandwidth overhead. In another example, transmitter 106 may compute a latency for placing the one or more repair packets for given bandwidth based on the priority between a bandwidth and a latency. Further, transmitter 106 may determine the placement for positioning the one or more repair packets at an end of an integral number of pictures based on the computed latency.

For example, transmitter 106 may perform network coding of the multimedia data stream to generate the repair packets as well as the network-coded multimedia data. The network coding may be a networking technique in which the multimedia data stream is encoded to increase network throughput, reduce delays, and make the network robust. In an example network coding, algebraic algorithms may be applied to the multimedia data stream to accumulate various transmissions. The algebraic algorithms may involve choice of Galois Field (GF) size, density, and generation/window size. Further, transmitter 106 may transmit the network coded multimedia data stream with the repair packets to receiving device 112.

Further, receiver 108 may receive a feedback message from receiving device 112. In an example, the feedback message may include packet loss rate information, decoded-video quality metric, or both. Furthermore, transmitter 106 is to determine a modified frequency for generating the repair packets and/or a modified placement for positioning the one or more repair packets in a multimedia data stream based on the packet loss rate information, decoded-video quality metric, or both (e.g., as shown in FIG. 1B).

Thus, examples described herein provides an approach in determining an optimal latency and overheads for a given set of conditions (e.g., including the source stream as well as channel conditions) and can be described as a parametric optimization problem as shown in equation 1.

$$\min(t, b) = \mathrm{argming}(R_s, R_c, R_p, \overline{S_f}) := \{R_r, \overline{S_p}\} \quad (1)$$

where 't' refers to the latency achieved/desired, and 'b' indicates the bandwidth overhead realized (e.g., due to repair packets). Further, multivariate function 'g' provides a mapping/relation between latency and overhead and depends on source rate ($R_s$) of input media stream, packet loss rate or channel loss rate ($R_c$), packet size ($R_p$) and the position of frames (e.g., I, P, B, and the like) in the media stream (e.g., $\overline{S_f}$ is a vector that indicates these positions). $R_r$ is the derived repair packet rate and $\overline{S_p}$ is a vector indicating the position of repair packets (to be placed in the stream). $R_r$ and $\overline{S_p}$ may be chosen such that they lead to a desired optimal latency and overhead bandwidth.

FIG. 1B is a block diagram of example system 100 of FIG. 1A, depicting a placement of adaptation module 104 for determining the frequency for generating repair packets and the placement for positioning the repair packets. Similarly, named elements of FIG. 1B may be similar in structure or function to elements described in FIG. 1A. FIG. 1B represents the placement of adaptation module 104 in system 100. As shown in FIG. 1B, adaptation module 104 can be placed before transmitter 106 to provide a necessary logic for determining the rate (frequency) and placement of repair packets. During operation, adaptation module 104 takes in packet loss rate (e.g., feedback received from receiving device 112), input characteristics (e.g., frames per second (fps) and bitrate) of the video stream to be transmitted and packet size as inputs and determines the appropriate rate and placement of the repair packet. Further, adaptation module 104 may communicate the determined rate and placement of the repair packet to transmitter 106. Transmitter 106 then generates and places the repair packets based on the determined rate and placement and performs the network coding.

Examples described herein envisions that the transmitting device can also generate repair packets in a manner sensitive to the encoding and decoding complexity. In addition to decisions on generating repair packets with a view to optimizing latency and bandwidth, the network coding system can also consider the encoding and decoding complexity associated with any candidate set of parameters of network coding (NC) encoding. Parameters that impact complexity are comprised of Galois Field (GF) width, generation/window size, and/or density/sparsity of coefficients. These factors affect both encoding and decoding complexity to slightly different extents. The impact of these factors has been modelled and depicted using graphs shown in FIGS. 4B to 4C.

Every choice of a network coding parameter used for encoding input video data has costs that are indicative of the encoder and decoder complexity, derived out of the model generated from experiments with various parameters vis-a-vis complexity. Adaptation module 104 can alter the network coding parameters judiciously whenever the total actual complexity cost exceeds the upper bound on complexity cost (of encoding as well as decoding).

Adaptation module 104 can set an upper bound for encoding complexity based on the computing capability available at each network node or element (in addition to the other parameters including latency, bandwidth overhead). In case of heterogeneous networks made of sub-networks where each sub-network has nodes with distinctly different computational capability, the encoding complexity for each sub-network can be set to a specific target on a per-subnetwork basis so that the network coding is carried out in a manner sensitive to this encoding complexity.

Adaptation module 104 can also set a target or upper bound for decoding complexity based on the computing capabilities of the constituent client devices. In one preferred embodiment of network architecture, clients can be grouped into different sub-networks based on their computational complexity and the decoding complexity for each sub-network and can be set to a specific target on a per-subnetwork basis so that the network coding is carried out in a manner sensitive to this encoding complexity.

Figure 1C:
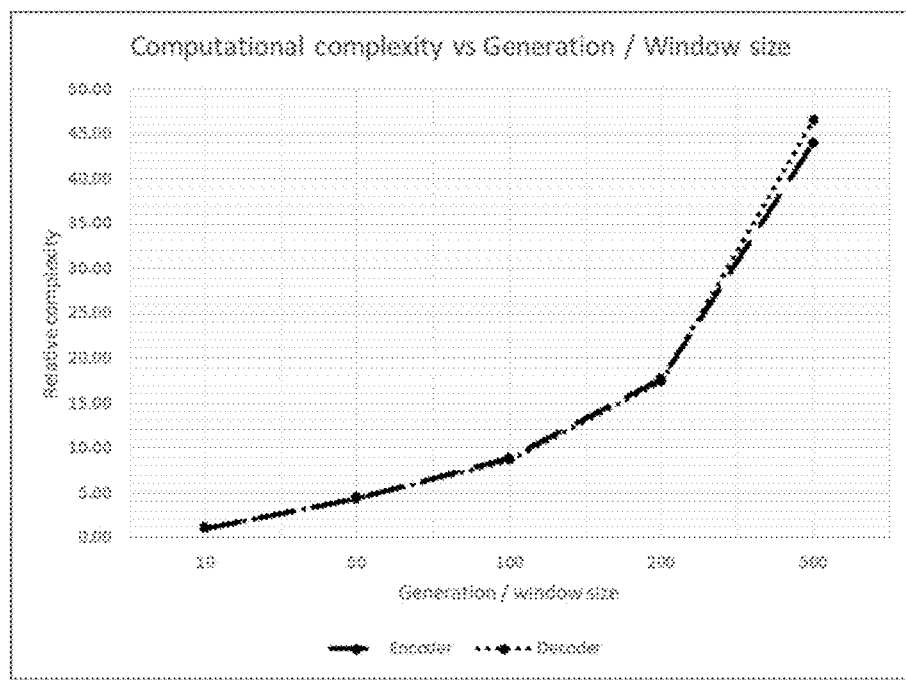
FIG. 1C shows an example graph depicting how normalized computational complexities for encoding and decoding vary with generation size or window size.
Figure 1D:
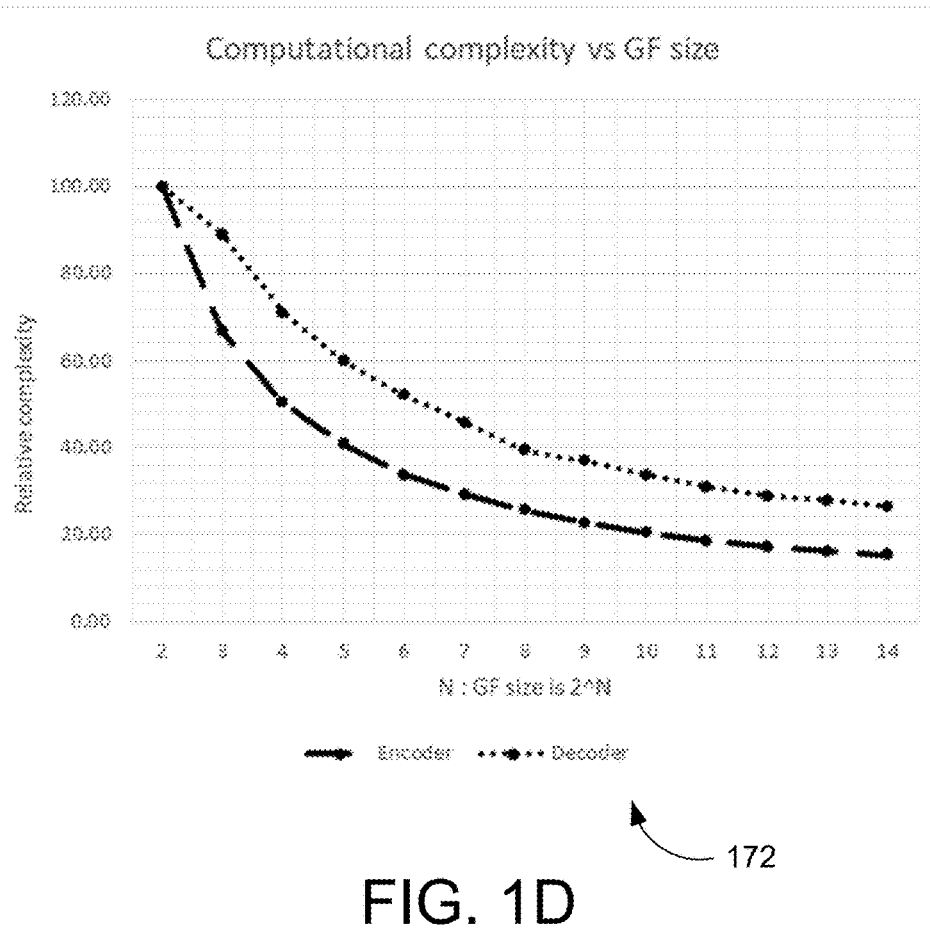
FIG. 1D shows an example graph depicting how normalized computational complexities for encoding and decoding vary with GF size.
Figure 1E:
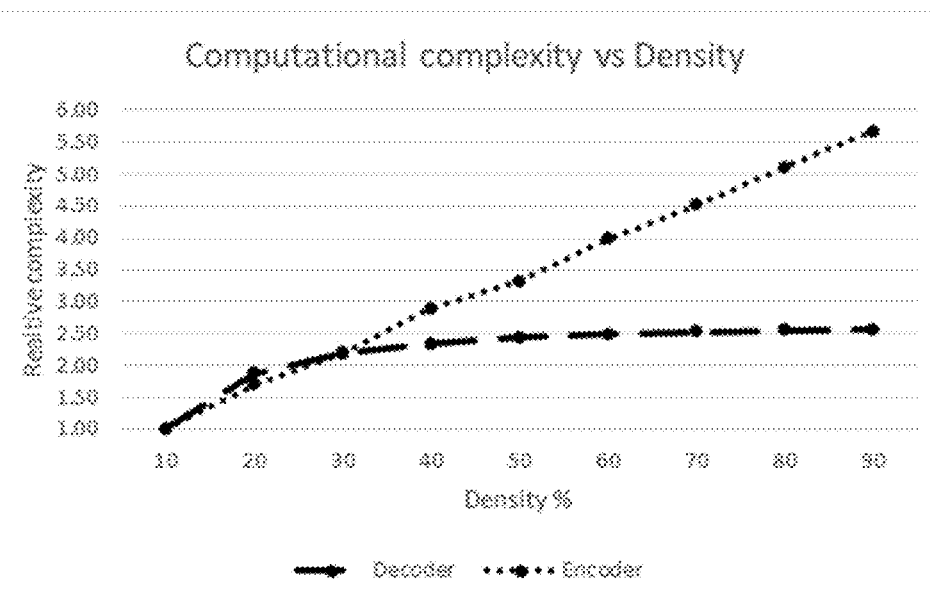
FIG. 1E shows an example graph depicting how normalized computational complexities for encoding and decoding vary with density.

FIG. 1C shows an example graph 170 depicting how a normalized computational complexity for encoding and decoding vary with generation size or window size. FIG. 1D shows an example graph 172 depicting how a normalized computational complexity for encoding and decoding vary with GF size. FIG. 1E shows an example graph 174 depicting how a normalized computational complexity for encoding and decoding vary with density.

From an optimization perspective of encoding/decoding complexity with respect to generation/window size, GF size and density, the optimization task can be formulated as follows:

Minimize encoding complexity $f_{Enc}(NC)$ and decoding complexity $f_{Dec}(NC)$ such that certain parameters satisfy a set of conditions as shown in the equation below where the sets take the form of admissible closed intervals [a, b], $$\text{Minimize } f_{Enc}(NC) \text{ and } f_{Dec}(NC)$$
$$\text{such that } \begin{cases} WinSize \in WSet \\ GF \in GFSet \\ Density \in Dset \end{cases}$$

To cast this as a Lagrangian optimization where f(NC) could denote encoding or decoding complexity, we could express it as:

$$\min \cdot f(NC) + a_{win} WinSize + a_{GF} GF + a_{density} \text{ Density} + \ldots$$

In the above equation, the constants $a_{win}$, $a_{GF}$, $a_{density}$ express, at any working point, the relative trade-off costs of changing each of the parameters with the goal of improving the quality/target function f(NC). In a case where f(NC) is differentiable with respect to the parameters, these constants would be the corresponding gradients, expressing a local linearization. From the data showed in FIGS. 1C, 1D, and 1E, it can be envisioned a mapping of (packet loss rate, overhead, GF size, density, and generation size) to (latency, encoding complexity, and decoding complexity).

In an example, the decoding complexity for a network or sub-network is decided based on the computational capability of client devices in that network or sub-network. In another example, the encoding complexity for a network or sub-network is decided based on the computational capability of nodes in that network or sub-network. In yet another example, the encoding and decoding complexity at any operating point are computed using gradients at that operating point, of the said encoding or decoding complexity with respect to one or more of the following parameters: Galois field width, density, and generation size.

In some examples, the functionalities described in FIGS. 1A and 1B, in relation to instructions to implement functions of adaptation module 104, transmitter 106, receiver 108, and any additional instructions described herein in relation to the storage medium, may be implemented as engines or modules including any combination of hardware and programming to implement the functionalities of the modules or engines described herein. The functions of adaptation module 104, transmitter 106, receiver 108 may also be implemented by a respective processor. In examples described herein, the processor may include, for example, one processor or multiple processors included in a single device or distributed across multiple devices.

Figure 2:
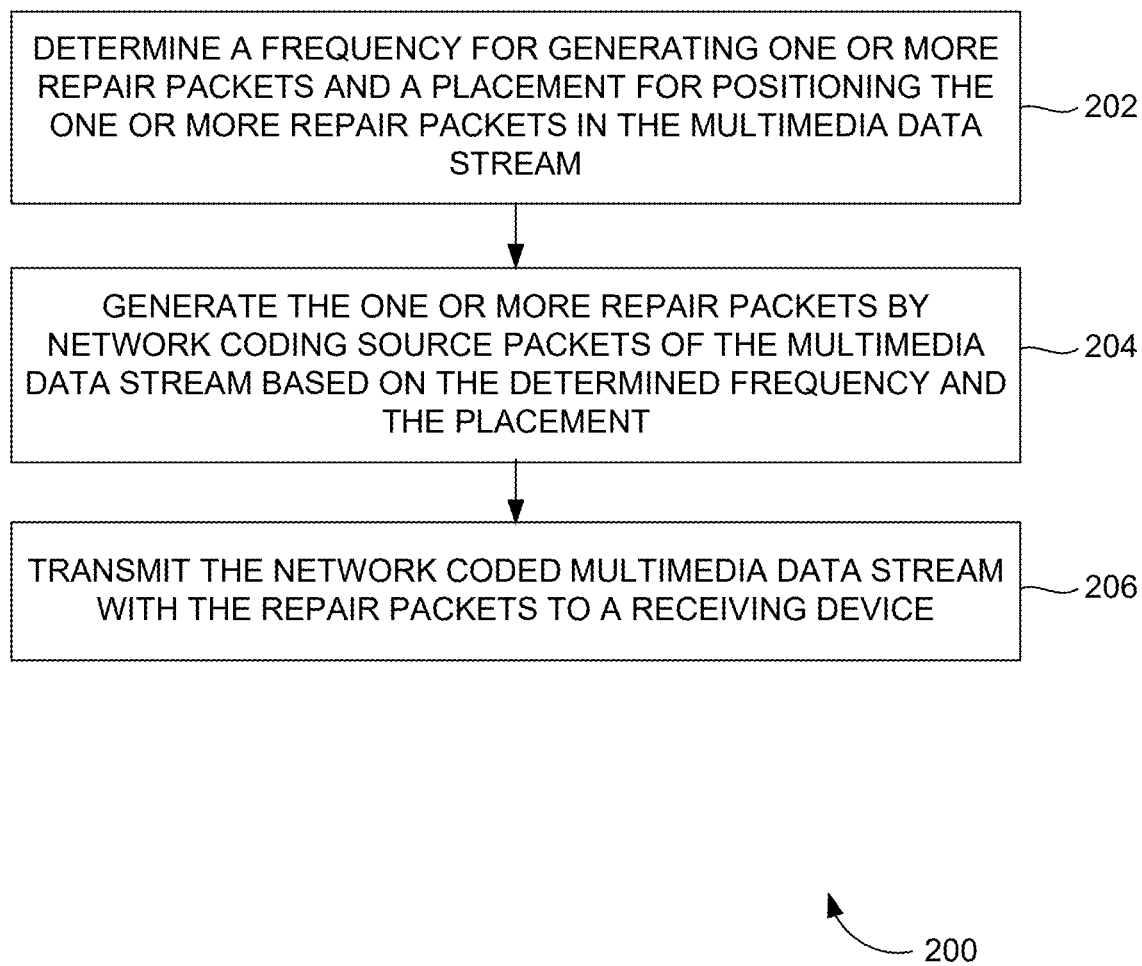
FIG. 2 is a flowchart illustrating an example method for generating one or more repair packets by network coding a multimedia data stream based on a determined frequency and the placement.

FIG. 2 is a flowchart illustrating an example method 200 for generating one or more repair packets by network coding a multimedia data stream based on a determined frequency and the placement. At 202, a frequency for generating one or more repair packets and a placement for positioning the one or more repair packets in the multimedia data stream may be determined based on a configuration parameter related to the multimedia data stream. For example, the configuration parameter related to the multimedia data stream may include a data rate of the multimedia data stream, a bit rate of the multimedia data stream, a frame rate of the multimedia data stream, a packet size, a repair packet size, a target latency, a target bandwidth, a packet loss rate between a transmitting device and a receiving device, or any combination thereof.

In an example, the frequency and the placement are determined based on a priority derived from a multimedia delivery use-case. An example multimedia data stream use-case may include a Web Real-Time Communication (WebRTC), a Low latency multimedia streaming, a video conferencing and collaboration, or an over-the-top multimedia delivery. The priority associated with the multimedia data stream use-case may include a priority between a latency and a bandwidth based on a network connection type (e.g., a wireless, a wireline, a fiber, or the like), a communication type, a network topology (e.g., a unicast, a multicast, a broadcast, a point-to-point, a multi-path, a multi-source/destination, or the like), a network path characteristic (e.g., jitter, propagation delay, and the like), or any combination thereof.

In an example, the frequency for generating the one or more repair packets may be determined by determining a fixed repair packet rate for generating the one or more repair packets based on the configuration parameter. Further, the placement for positioning the one or more repair packets may be determined in a content-aware manner based on a choice of an interleaving pattern of the one or more repair packets with the source packets.

In an example, determining the frequency and placement for positioning the one or more repair packets based on the configuration parameter may include generating a mapping function between a data rate of the multimedia data stream, a bit rate of the multimedia data stream, a frame rate of the multimedia data stream, a packet loss rate between the transmitting device and the receiving device, a repair packet size, a target latency, a target bandwidth, an upper bound on an encoding complexity, and an upper bound on a decoding complexity. Further, the frequency for generating one or more repair packets and the placement for positioning the one or more repair packets may be determined by optimizing one or more of a latency, a bandwidth, an encoding complexity, and a decoding complexity based on the mapping function.

For example, the mapping function may be generated by applying a machine learning model to the data rate of the multimedia data stream, the bit rate of the multimedia data stream, the frame rate of the multimedia data stream, the packet loss rate, the repair packet size, the target latency, the target bandwidth, the upper bound on encoding complexity, and the upper bound on decoding complexity based on the priority. The machine learning model may be selected from models across big data involving various network coding configurations and multimedia data streams. In an example, the machine learning model may include a deep neural network, a radial basis function neural network, a wavelet basis function neural network, a multilayer perceptron, a support vector machine, a support vector regression, or any combination thereof. In another example, the machine learning model may include a reinforcement learning, a deep reinforcement learning, a backpropagation algorithm, or any combination thereof. The machine learning model may determine the frequency and the placement by optimizing one or more of the latency, the bandwidth, the encoding complexity, and the decoding complexity based on a selection of configuration parameters related to the multimedia data stream using a random forest algorithm.

A multilayer perceptron (MLP) may be composed of multiple layers of nodes or neurons which are fully connected using a feedforward architecture. The activation function used in the nodes (e.g., especially those in layers which are not connected directly to the inputs), involving non-linear operations. Example MLPs are trained using backpropagation algorithm. The backpropagation algorithm works by computing the gradient of the loss function with respect to each weight, computing the gradient one layer at a time, iterating backward from the last layer (i.e., proceeding to the preceding layers). Thus, the MLPs are efficient in classification, function approximation and multidimensional non-linear mapping tasks. Further, support vector machines (SVM) are widely used in classification and regression tasks. The SVM algorithm creates a line or a hyperplane (e.g., to separate the data into classes) by first mapping training examples to points in space to maximize the width of the gap between the classes. New examples are then mapped into that same space and predicted to belong to a class based on which side of the gap (and the contained hyperplane) that they fall. Further, the support vector regression (SVR) uses the same principles as the SVMs. SVR finds the best fit hyperplane associated with the maximum number of data points.

A radial basis function network is a form of an artificial neural network that uses radial basis functions as activation functions. The output of the network is a linear combination of radial basis functions (e.g., each with independent parameters) acting on the weighted sum of the inputs. Gaussian basis functions have performed very well as radial basis functions, with excellent localization properties. The radial basis function networks may be used in classification as well as function approximation, multidimensional mapping, and time series prediction. Wavelet neural networks are recent networks that synergize the classic neural networks with wavelet functions and analysis. Such networks may include a feed-forward neural network whose activation functions are drawn from an orthonormal wavelet family.

Reinforcement learning (RL) is a training method used in machine learning which rewards desired behaviours and/or penalizes undesired ones. Any reinforcement learning agent can perceive and understand its environment in order to take appropriate actions to learn through trial and error. The RL is suitable in cases where a dataset of input-output pairs of values (i.e., for the parameters involved in the optimization to train an ML network) is not available. The RL approach can start without such a dataset and adaptively adjust the target variables and collecting the data along the way. Further, the random forest uses a plurality of decision trees on various subsets of the given dataset and takes the average to improve the predictive accuracy of that dataset, instead of relying on just any one decision tree.

At 204, the one or more repair packets may be generated by network coding source packets of the multimedia data stream based on the determined frequency and the placement. In an example, the one or more repair packets may be generated to provide an unequal protection for different audio channels of the multimedia data stream. In another example, the one or more repair packets may be generated to provide an unequal protection for different video coding layers of the multimedia data stream.

In an example, determining the placement for positioning the one or more repair packets in the multimedia stream may include computing a bandwidth overhead for placing the one or more repair packets for a given latency based on the priority between a bandwidth and a latency. Further, placement for positioning the one or more repair packets at an end of an integral number of pictures may be determined based on the computed bandwidth overhead. In another example, determining the placement for positioning the one or more repair packets in the multimedia stream may include computing a latency for placing the one or more repair packets for given bandwidth based on the priority between a bandwidth and a latency. Further, placement for positioning the one or more repair packets at an end of an integral number of pictures may be determined based on the computed latency. For example, determining the placement for positioning the one or more repair packets in the multimedia data stream may include determining the placement for positioning the one or more repair packets at an end of every "n" pictures. "n" is an integer starting from 1. Each picture may include a slice or a frame.

In another example, determining the placement for positioning the one or more repair packets in the multimedia data stream may include determining the placement for positioning the one or more repair packets at an end of every n fields when the multimedia data stream includes interlaced digital video, wherein n is an integer starting from 1. Interlaced video signals may use two fields for each video frame, i.e., a top field and a bottom field. For true interlaced video capture, the two fields are captured consecutively. The interlaced capture may take place in two passes (resulting in two fields). The first pass may cover the first and all odd numbered lines, from the top left corner to the bottom right corner. The second pass may cover the second and all even numbered lines, filling in the gaps in the first scan. Digital video technologies such as MPEG2 video may incorporate both field-based and frame-based prediction modes. In the field-based mode, which usually works for fast motion, each field is predicted and each difference field is coded separately. In the frame-based mode, which works under conditions of slow or no motion, the frame is treated as a whole and coded as a unit. In field-based mode there is a question of what data to use as the reference field, i.e., which field, top or bottom. This additional information of the prediction mode (i.e., the field-based mode or frame-based mode) may have to be coded and sent along. In such cases, the repair packets of network coding can be placed at the end of each field, or at the end of an integral number of fields.

In yet another example, determining the placement for positioning the one or more repair packets in the multimedia data stream may include determining the placement for positioning the one or more repair packets at an end of every n wavefronts or n tiles of video data in the multimedia data stream, wherein n is an integer starting from 1. In an example, the use of slices in digital video technologies like H.264 or AVC is for error resilience, i.e., to prevent loss of quality in case of transmission errors. While slices can also be used to parallelize the decoder, there are certain issues in employing slices for parallelism. Using many slices to increase parallelism incurs significant coding losses. Certain digital video technologies, e.g., high efficiency video coding (HEVC) or H.265 may have the provision for tiles which divide each frame into a grid of rectangular regions that can independently be decoded/encoded. Unlike slices, the tiles are not completely separate units in terms of syntactic encoding. This division makes the technology more conducive for implementation on multi-core or parallel architectures.

In an example wavefront parallel processing (WPP), WPP allows creation of picture partitions that can be processed in parallel without incurring high coding losses. HEVC allows for WPP. In WPP, rows of blocks (wavefronts) are processed in parallel while preserving all coding dependencies. Because processing of a block requires the left, top-left, top, and top-right blocks to be available for HEVC predictions to operate correctly, a shift of at least two blocks is enforced between consecutive rows of blocks processed in parallel. An example use case for WPP may include high-quality streaming over robust channels. In combination with dependent slices, examples described herein can be also used in ultra-low delay applications. When the digital video technology allows for tiles or WPP, the repair packets of network coding can be placed at the end of each tile/WPP, or at the end of integral number of tiles/WPP.

In other examples, generating the one or more repair packets may include:
  receiving, from a video encoder of the transmitter, information associated with one or more of: human visual system (HVS) perceptual parameters, spatial complexity, and temporal complexity associated with different parts of a video signal of the multimedia data stream, and
  generating the one or more repair packets to provide different protection for different parts of the video signal based on the received information from the video encoder.

For example, the video encoder may use the HVS and related perceptual information to adapt the video encoding to realize psycho-visual bitrate savings, meaning that the video encoder produces a lower size encoded video which perceptually looks similar to the original video signal which may have been much larger in size, partly due to intricate details which the human perception system does not perceive in all constituent detail.

Video signals are characterized by spatial and temporal complexity. A rapidly moving soccer or tennis ball is an example of a video signal which has high temporal complexity but low spatial complexity (especially if all spatial or pixel details on the moving object are not clear in the video signal). A high action video involving moving objects whose spatial details are also defined in high resolution is an example of a video signal with high temporal and spatial complexity. A video with a lot of walking or slowly moving people whose textural and spatial details are clearly defined, the said movement also involving complex background like rustling leaves or rippling water, is an example of a video signal with high spatial complexity but low temporal complexity. Spatial and temporal complexity are used by video encoders to realize bitrate savings.

In summary, some parts of any video signal are more important to preserve in detail since they have a large impact on human perception while others are not important to preserve in detail. The video encoder determines HVS and temporal/spatial complexity information (during its process of video encoding) to figure out which parts of video signal are more important to preserve in detail. The network coder can use more repair packets to protect such important parts of the video differentially.

For example, network coding the multimedia data stream to generate the repair packets as well as network-coded multimedia data may be performed. In an example, the network coding can be performed in one or more of the following configurations: (a) systematic or non-systematic, (b) sparse or dense, and (c) block or adaptive (e.g., sliding window). In an example systematic code, the input data symbols are embedded in the coded output. In an example non-systematic code, the coded output contains only the coded symbols and does not contain the input symbols. Density of a code is defined by a number of nonzero coefficients in the coded output. A sparse code contains many zero coefficients. Sparse network coding is used to reduce the complexity of the network coding (e.g., RLNC), by selecting a sparse coefficient matrix to code the repair packets. Examples described herein may cater to both systematic and non-systematic modes of network coding. Accordingly, the term 'source packets' may denote non-network-coded data, in case of systematic coding. Such source packets may have undergone video or audio coding. In case of non-systematic coding, the term 'source packets' may denote already network-coded packets. In some cases, the source packets may include a combination of network-coded and non-network coded packets.

Sliding window-based network coding schemes use an encoding window that slides over source symbols, generating new repair symbols whenever needed. In block-based network coding, the input data symbols are encoded in terms of blocks, i.e., block-by-block, where the blocks are non-overlapping. Compared to block-based network coding schemes, sliding window is conducive for real-time delivery due to reduced network coding-related latency while also often providing improved packet erasure recovery capabilities.

At 206, the network coded multimedia data stream with the repair packets may be transmitted by a transmitting device to a receiving device. Further, a feedback message may be received from the receiving device. The feedback message may include source packet acknowledgment information (optional), packet loss rate information, decoded-video quality metric, or any combination thereof. Based on the packet loss rate information, decoded-video quality metric, or both, a modified frequency may be determined for generating the one or more repair packets and/or a modified placement for positioning the one or more repair packets in a multimedia data stream.

In other examples, generating the one or more repair packets may include increasing the number of generated repair packets when the decoded-video quality metric is less than a specific threshold. In an example, the decoder in the receiving device receiving the network coded packets of the video data has a notion of the decoded video quality. For instance, the video quality gets degraded by macro blocking or other blocking artifacts, blurring artifacts or ringing artifacts. Such degradations can take place due to packet losses during transmission, or due to other reasons. Hence, it is beneficial for the network coding system to increase the number of repair packets then the decoded-video quality falls below the specific threshold. The decoded-video quality can be determined by 'no-reference' based methods, since the decoder does not have access to the original video data which was input to the encoder. Video quality metrics such as PSNR, VMAF may need such video data since they are 'reference-based' metrics. Though the use of such metrics is not precluded under this invention in cases where information relating to the reference can be accessed by decoder, some information on no-reference metrics is provided below, since they would be more useful in the network coding scenario. "No-reference based metrics use a model that try to assess the quality of a distorted video without any reference to the original signal. Due to the absence of an original signal, they may be less accurate than "full-reference" approaches but are efficient to compute. Such no-reference metrics can be based on pixel-based models which use a decoded representation of the signal and analyze the quality based on the pixel information. These evaluate specific degradation types, such as blurring or other coding artifacts. Another class of no-reference metrics use parametric/bitstream methods wherein the models make use of features extracted from the transmission container and/or video bitstream, e.g., MPEG-TS packet headers, motion vectors and quantization parameters. In contrast to pixel-based models, they have no access to the final decoded signal, which reduces their complexity while delivering picture quality predictions that are not as accurate. No-reference based methods also include hybrid models. Such hybrid models combine parameters extracted from the bitstream with a decoded video signal.

Thus, examples described herein provides an analysis-based method that arrive at a mapping function (e.g., either learnt by the machine learning (ML), a deep learning (DL), or the like) between the data rate of the input stream (source packets of the multimedia data stream), atomic and framing syntax elements within the input stream, channel error characteristics, a repair packet size, a repair packet rate, and a repair packet placement that leads to a jointly optimal solution of latency and bandwidth overhead (e.g., induced by the repair packets).

Further, the content-aware or video-aware aspects of the examples described herein may ensure generation of the repair packets at a rate which adapts itself to the network conditions as well as placing them at the right points, by intelligent choice of the interleaving pattern of the repair packets with the source packets. Thus, the network coding in a video-aware manner makes for a dynamically optimal user-experience, over long sessions of video delivery, over a heterogeneous network that could include wireless channel elements. Hence, examples described herein provides a value, especially in live events and collaboration use cases, where the channel conditions could vary over the session as more users join the events, or there could be sudden increases in network congestion due to variations in load (e.g., instantaneous increase on demand or patterns in bandwidth demands based on a time-of-day).

Figure 3A:
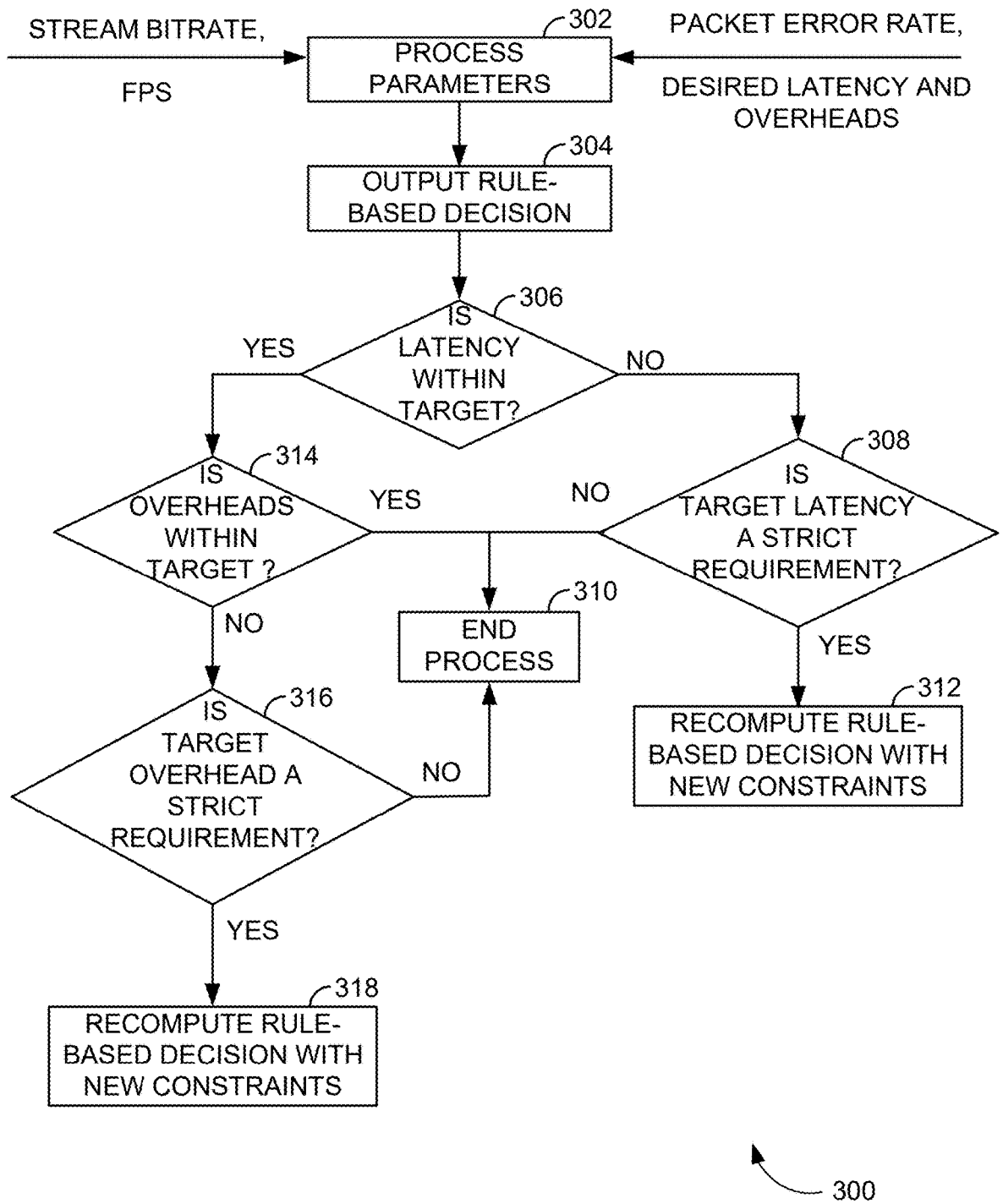
FIG. 3A is a flowchart illustrating an example method for delivering a multimedia data stream.

FIG. 3A is a flowchart illustrating an example method 300 for delivering a multimedia data stream. Example method 300 may provide a logic used in an adaptation module (e.g., adaptation module 104 of FIG. 1A). At 302, parameters associated with the multimedia data stream such as a stream bitrate and frames per second (fps), and information associated with data packets such as a packet loss rate, desired latency, and desired overhead may be received by the adaptation module for processing. At 304, based on the processed parameters rule-based decision may be outputted by the adaptation module. For example, the output may be a fixed repair packet rate and an end of frame (EOF) repair packet placement.

At 306, a check may be made to determine whether a latency is within a target. When the latency is not within the target, a check may be made to determine whether the target latency is a strict requirement, at 308. When the target latency is not a strict requirement, the process may be ended, at 310. When the target latency is a strict requirement, the rule-based decision may be recomputed with new constraints, at 312 (i.e., new parameters). For example, an outcome recomputed rule-based decision at block 312 is a fixed repair packet rate, an EOF repair packet placement, and overheads required for given latency.

When the latency is within the target, a check may be made to determine whether the bandwidth overheads are within the target, at 314. When the overheads are within the target, the process may be ended, at 310. When the overheads are not within the target, a check may be made to determine whether the target overhead is a strict requirement, at 316. When the target overhead is not a strict requirement, the process may be ended at 310. When the target overhead is a strict requirement, the rule-based decision may be recomputed with new constraints, at 318. For example, an outcome of block 318 is a fixed repair packet rate, an EOF repair packet placement, and a latency required for given overheads.

Figure 3B:
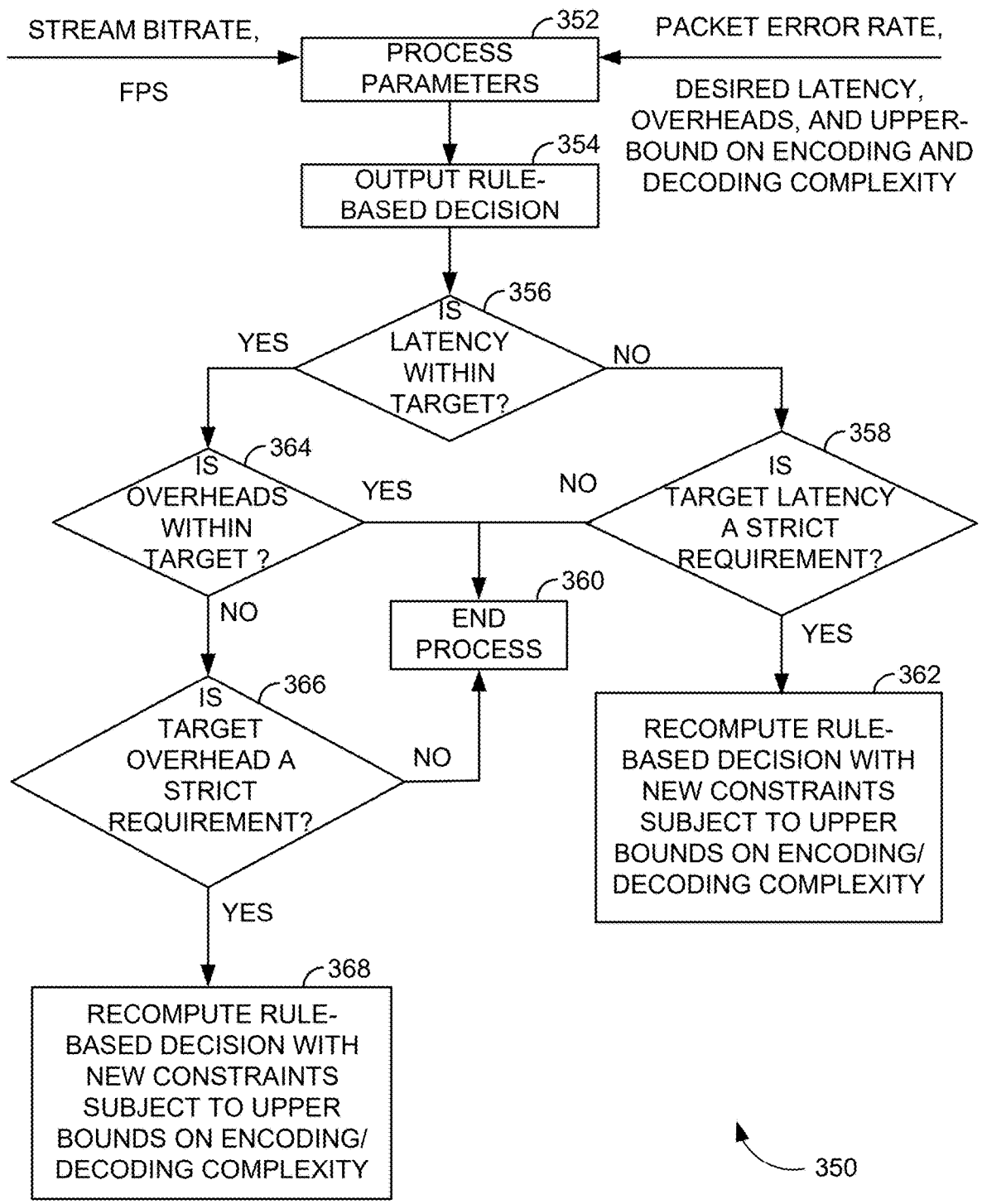
FIG. 3B is a flowchart illustrating another example method for delivering the multimedia data stream.

FIG. 3B is a flowchart illustrating another example method 350 for delivering the multimedia data stream. Example method 350 may provide a logic used in an adaptation module (e.g., adaptation module 104 of FIG. 1A). At 352, parameters associated with the multimedia data stream such as a stream bitrate and frames per second (fps), and information associated with data packets such as a packet loss rate, desired latency, desired overhead, and upper bounds on encoding and decoding complexity may be received by the adaptation module for processing. At 354, based on the processed parameters rule-based decision may be outputted by the adaptation module which may be subjected to upper bounds on the encoding and decoding complexity.

At 356, a check may be made to determine whether a latency is within a target. When the latency is not within the target, a check may be made to determine whether the target latency is a strict requirement, at 358. When the target latency is not a strict requirement, the process may be ended, at 360. When the target latency is a strict requirement, the rule-based decision may be recomputed with new constraints subject to upper bounds on the encoding/decoding complexity, at 362 (i.e., new parameters). For example, an outcome of block 362 is a fixed repair packet rate, an EOF repair packet placement, and overheads required for given latency.

When the latency is within the target, a check may be made to determine whether the bandwidth overheads are within the target, at 364. When the overheads are within the target, the process may be ended, at 360. When the overheads are not within the target, a check may be made to determine whether the target overhead is a strict requirement, at 366. When the target overhead is not a strict requirement, the process may be ended at 360. When the target overhead is a strict requirement, the rule-based decision may be recomputed with new constraints subject to upper bounds on the encoding/decoding complexity, at 368. For example, an outcome of block 368 is a fixed repair packet rate, an EOF repair packet placement, and a latency required for given overheads.

Examples described herein provides the adaptation module, which follows the rule-based logic with no memory. Thus, the adaptation module can be called multiple times for any adaptation in the repair packets when there is a change an input condition (e.g., a packet loss rate, input stream properties, and the like). Further the adaptation model may be built using a machine learning (ML) method, a deep learning (DL) method, or the like. For example, an empirical rule-based method or the machine learning method can be used to develop the adaptation module across large data (e.g., with various configurations, video streams, and the like). Thus, the adaptation module can facilitate in determining near-optimal values for latency and overhead for a given repair packet rate.

Example methods 200, 300, and 350 depicted in FIGS. 2, 3A, and 3B may represent generalized illustrations. Other processes may be added, or existing processes may be removed, modified, or rearranged without departing from the scope and spirit of the present application. In addition, methods 200, 300, and 350, may represent instructions stored on a computer-readable storage medium that, when executed, may cause a processor to respond, for example, to perform actions, to change states, and/or to make decisions. Methods 200, 300, and 350 may represent functions and/or actions performed by functionally equivalent circuits like analog circuits, digital signal processing circuits, application specific integrated circuits (ASICs), or other hardware components associated with the system. Furthermore, methods 200, 300, and 350 are not intended to limit the implementation of the present application. Rather, example methods 200, 300, and 350, may illustrate functional information to design/fabricate circuits, generate computer-readable instructions, or use a combination of hardware and computer-readable instructions to perform the illustrated processes.

Figure 4:
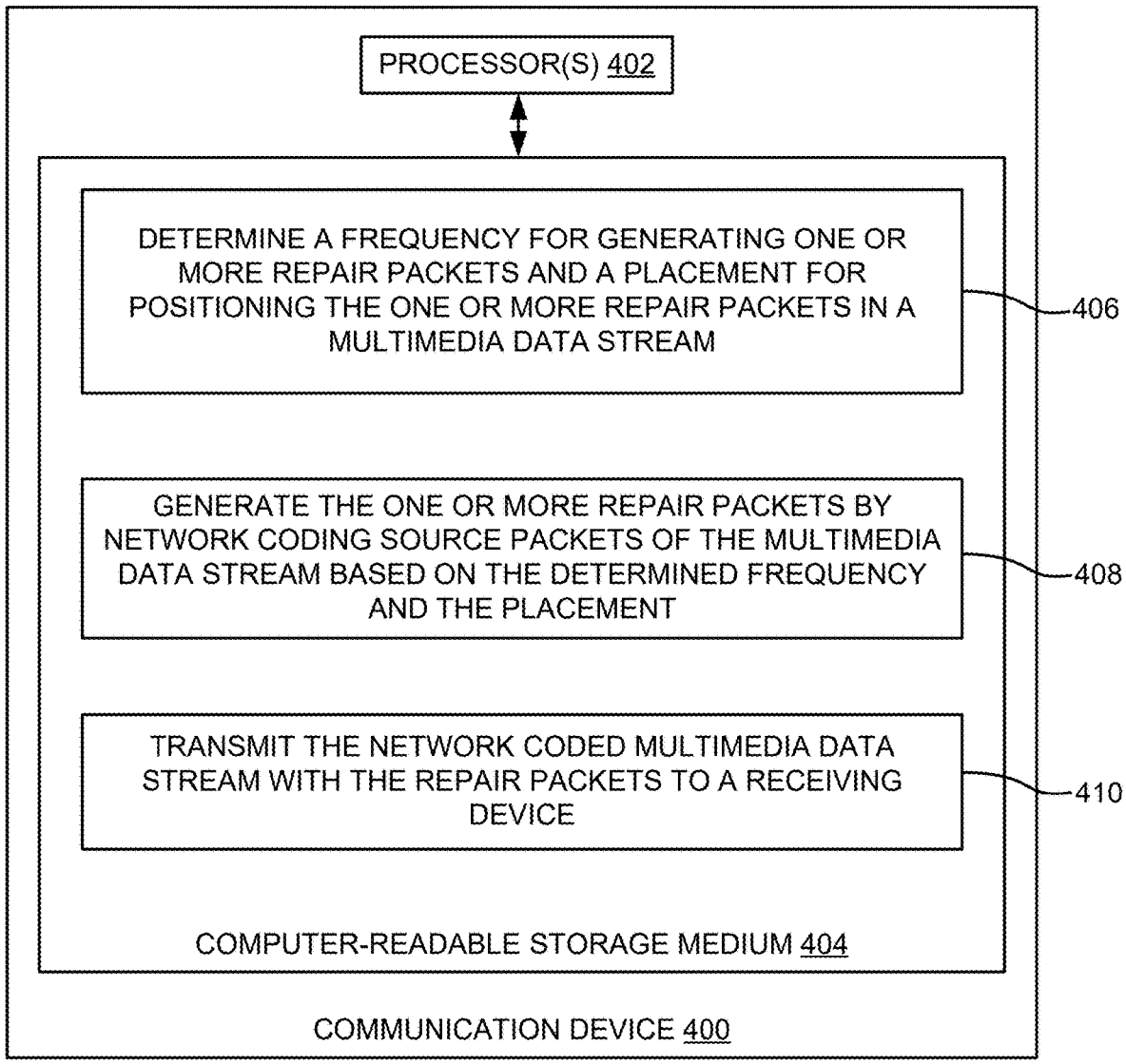
FIG. 4 is a block diagram of an example communication device, including a non-transitory computer-readable storage medium storing instructions to deliver a multimedia data stream with repair packets.

FIG. 4 is a block diagram of an example communication device 400 including a non-transitory computer-readable storage medium 404 storing instructions to deliver a multimedia data stream with repair packets. Further, communication device 400 may include a processor 402 and computer-readable storage medium 404 communicatively coupled through a system bus. Processor 402 may be any type of central processing unit (CPU), microprocessor, or processing logic that interprets and executes computer-readable instructions stored in computer-readable storage medium 404. Computer-readable storage medium 404 may be a random-access memory (RAM) or another type of dynamic storage device that may store information and computer-readable instructions for execution by processor 402. For example, computer-readable storage medium 404 may be synchronous DRAM (SDRAM), double data rate (DDR), Rambus® DRAM (RDRAM), Rambus® RAM, etc., or storage memory media such as a floppy disk, a hard disk, a CD-ROM, a DVD, a pen drive, and the like. In an example, computer-readable storage medium 404 may be a non-transitory computer-readable medium. In an example, computer-readable storage medium 404 may be remote but accessible to communication device 400.

Computer-readable storage medium 404 may store instructions 406, 408, and 410. Instructions 406 may be executed by processor 402 to determine a frequency for generating one or more repair packets and a placement for positioning the one or more repair packets in a multimedia data stream based on a configuration parameter related to the multimedia data stream. In an example, the frequency and the placement may be determined based on a priority derived from a multimedia delivery use-case. In an example, instructions 406 to determine the frequency and placement for positioning the one or more repair packets based on the configuration parameter may include instructions to:

generate a mapping function between a data rate of the multimedia data stream, a bit rate of the multimedia data stream, a frame rate of the multimedia data stream, a packet loss rate between the transmitting device and the receiving device, a repair packet size, a target latency, a target bandwidth, an upper bound on an encoding complexity, and an upper bound on a decoding complexity; and determine the frequency for generating one or more repair packets and the placement for positioning the one or more repair packets by optimizing one or more of a latency, a bandwidth, an encoding complexity, and a decoding complexity based on the mapping function.

Instructions 408 may be executed by processor 402 to generate the one or more repair packets by network coding source packets of the multimedia data stream based on the determined frequency and the placement. In an example, instructions to determine the placement for positioning the one or more repair packets in source packets of the multimedia data stream may include instructions to:

compute a bandwidth overhead for placing the one or more repair packets for a given latency based on the priority between a bandwidth and a latency, and determine the placement for positioning the one or more repair packets at an end of an integral number of pictures based on the computed bandwidth overhead.

In another example, instructions to determine the placement for positioning the one or more repair packets in source packets of the multimedia data stream may include instructions to:

compute a latency for placing the one or more repair packets for given bandwidth based on the priority between a bandwidth and a latency, and determine the placement for positioning the one or more repair packets at an end of an integral number of pictures based on the computed latency.

Instructions 410 may be executed by processor 402 to transmit the network coded multimedia data stream with the repair packets to a receiving device. Further, computer-readable storage medium 404 may store instructions to receive a feedback message from the receiving device. In an example, the feedback message may include optional source packet acknowledgment information, packet loss rate information, decoded-video quality metric, or both. Further, a modified frequency may be determined for generating the repair packets and/or a modified placement for positioning the one or more repair packets in a multimedia data stream based on the packet loss rate information, decoded-video quality metric, or both.

Implementation and Simulation

Examples described below provide a landscape of video delivery protocols and a rationale behind conducting experiments which lead into a user datagram protocol (UDP) based use-cases. The UDP may be used for live-streaming audio and video, voice over IP (VoIP), and videoconferencing. For example, in a broadcast session with multiple destinations, the UDP does not set up a connection with each receiver beforehand. Thus, the UDP is conducive to live-streaming, some low-latency gaming applications, video conferencing, Web-real time communications—WebRTC, and the like. In the examples described herein, network coding such as RLNC may be implemented at an application layer, with underlying UDP. Thus, packet losses in a digital video delivery may be analyzed using the UDP.

Figure 5:
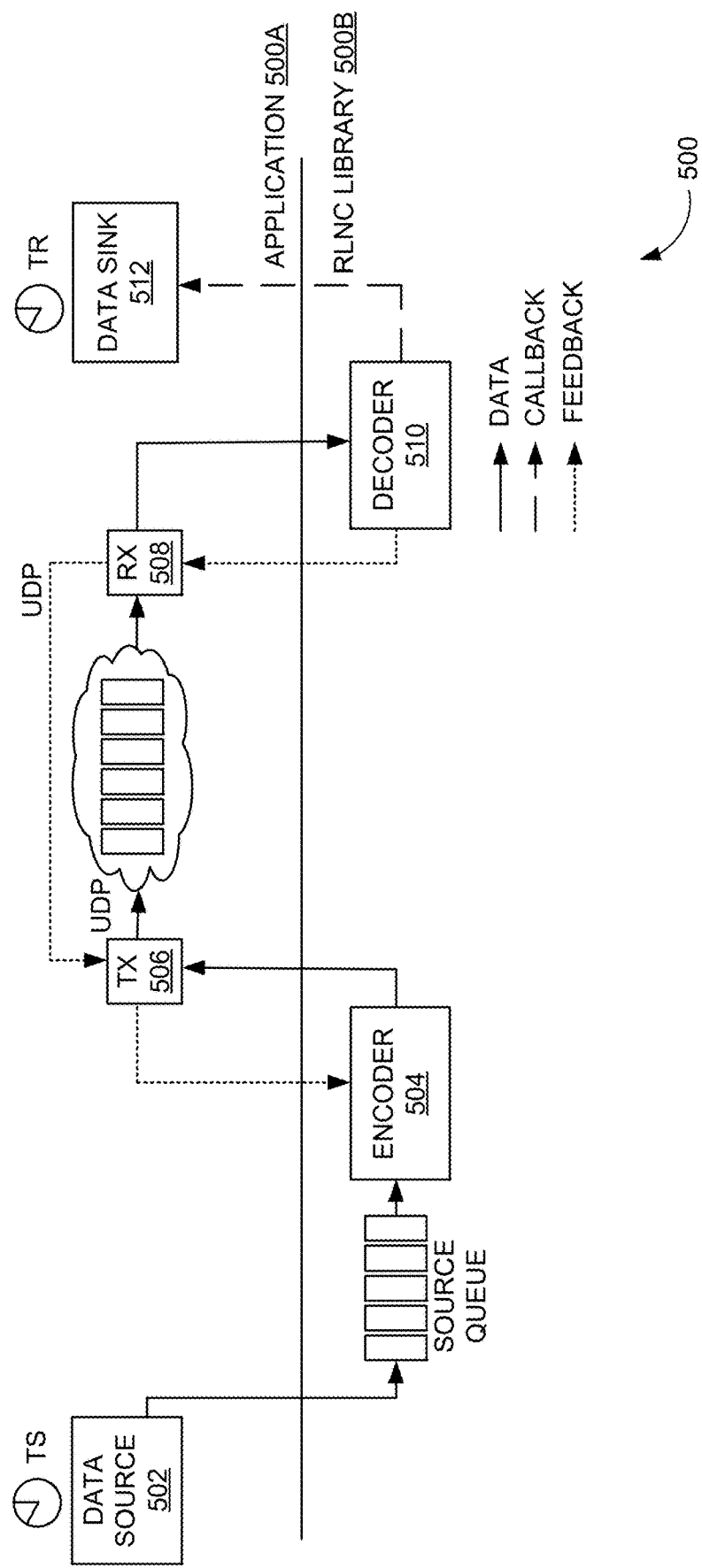
FIG. 5 is a block diagram of an example simulation setup for delivering a multimedia data stream with repair packets.

FIG. 5 is a block diagram of an example simulation setup 500 for delivering a multimedia data stream with repair packets. Example simulation setup 500 may include two layers, i.e., an application layer 500A and a RLNC library 500B. Further, simulation setup 500 may include a data source 502, an encoder 504, a transmitter 506, a receiver 508, a decoder 510, and a data sink 512, which may be communicatively connected as shown in FIG. 5.

In example simulation setup 500, both transmitter 506 and receiver 508 may be run on a same communication device. This simplification may ease out the need of time-synchronization in the context of latency calculation. Further, example simulation setup 500 also captures information such as an exact number of repair packets that are received by decoder 510 in order to recover a lost packet, as well as the amount of time taken for decoding.

Consider simulation of a use-case of streaming of H.264/MPEG4-AVC video content from a pre-encoded video file. The streaming may be performed in a rate-regulated manner (e.g., at 30 fps). From the video file, one video frame may be extracted at a time. Subsequently, each frame is chunked into a fixed size packet length (e.g., p_size). Additionally, information such as a frame length, a frame time stamp, and an end-of-frame marker may be inserted in a packet, to enable collection of latency statistics at a receiver 508. These source packets are then submitted to the source packet queue of encoder 504 (e.g., RLNC encoder), upon which the RLNC encoder operates. Further, encoder 504 may produce repair packet as well as source packet (i.e., the multimedia data) after adding header bytes.

For example, based on a configuration chosen, repair packets (RP) may be generated at a specific frequency, also placing them amongst the source packets in the video stream, as per specific chosen strategies. Further, the source and the repair packets may be transmitted over a network to receiver 508 using a user datagram protocol (UDP) socket.

In an example, based on a loss rate configuration, certain packets may be dropped to simulate packet losses before further transmission. On receiving the packets from the UDP socket, receiver 508 may submit the packets to decoder 510. Further, decoder 510 uses the repair packets to recover if any source packet is lost. In example simulation setup 500, decoder 510 sends acknowledgements for correct receipt of the source packets. Until such correct receipt has been confirmed by decoder 510, encoder 504 continues to generate and send the repair packets in addition to the source packets, suitably modulating the size of a sliding window.

In an example, decoder 510 may store a last successful recovered/received source packet identifier. The 'successful source packet ID' may be sent back to transmitter 506/encoder 504 over a backchannel UDP socket as an acknowledgement. When encoder 504 receives the acknowledgement and information about successful decoding of a specific source packet, encoder 504 may remove any source packet sent before receiving the acknowledgement, up to the currently successfully decoded packets, from encoder 504 source packet queue. Thus, encoder 504 maintains a variable length source packet queue. If receiver 508 does not receive a packet and decoder 510 is not able to successfully recover the packet, decoder 510 acknowledgement gets delayed automatically and the network coding (e.g., RLNC) encode window gets adapted automatically. Eventually, decoder 510 is able to decode the packets successfully if enough repair packets have been inserted as per need. Thus, examples described herein ensure a no-loss recovery of the video packets at decoder 510.

Once decoder 510 is able to successfully decode a video frame completely (e.g., which is identified based on the marker bit), the latency may be computed based on the frame timestamp provided in the packet. In this example, the latency may build up if decoder 510 does not receive the source packets on time. In another example, decoder 510 may not wait for the lossless reconstruction. Instead, decoder 510 times out after a certain interval corresponding to the notion that a certain presentation time has been attained. In this example, decoder 510 may have a potentially lossy version of the source data. In this example, quality of received lossy video may be affected if the source and repair packets are not received before a target presentation time.

Example Configuration and Software Specifications

The following configuration of the network coding (e.g., RLNC_CFG) scheme has been used in the experimentations:
Coding method: Systematic—In this scheme, the source packets are transmitted as they are (i.e., after adding some header information in the simulation) along with coded packets at chosen frequency and position.
Generation size: Adaptive (e.g., on-the-fly)—In this case, the encoder adapts the encode window (also referred as the generation size) automatically based on the acknowledgement feedback from the receiver.
Sparsity: NIL (i.e., 'Dense' coding)—While generating the repair packet, the RLNC uses all the packets in the encode window rather than a chosen subset.

Further, the use-cases are simulated under different configurations of the packet size, loss rates, and acknowledgement frequencies. Further, the simulations have been conducted using a software called "streamc", for instance. This implements on-the-fly network coding encode and decode schemes suitable for low latency live streaming. Furthermore, platform specification used for the observations are as below.
Intell CITM) i7-7700T CPU @ 2.90 GHz
Ubuntu 18.04
Consider a case of packet loss scenarios and patterns simulated. The simulations drop packets at random, using the rand( ) function. This simulates a uniform distribution for packet losses. Further, example test contents are shown in Table 1.

TABLE 1

| Stream 1 | |
|---|---|
| Resolution | 640 × 480 |
| Bitrate | 691 Kbps |
| Frame Rate | Streamed at 30fps |
| GOP size (average) | 114 (variable GOP length) |
| GOP Structure | IPBBP |
| Stream 2 | |
| Resolution | 1920 × 1080 |
| Bitrate | 4734 Kbps |
| Frame Rate | Streamed at 30fps |
| GOP size (average) | 111 (variable GOP length) |
| GOP Structure | IPBBP |
| Stream 3 | |
| Resolution | 1920 × 1080 |
| Bitrate | 4063 Kbps |
| Frame Rate | Streamed at 30fps |
| GOP size (average) | 110 (variable GOP length) |
| GOP Structure | IPBBP |

Results

To understand the efficacy of network coding (e.g., RLNC) sliding window scheme and specifically in the context of placement of repair packets in a media aware configuration, different configurations of repair packets are studied while varying parameters like packet loss rate, source (and repair) packet size and media stream characteristics. In the following description, the packet loss rate is instantiated by the packet loss rate. Also, in FIGS. 6A to 6G, the actual latency depicted against each frame depends on which of the specific packets are in error. Further, graphical representations in FIGS. 6A to 6G indicate the latency for different placement of the repair packets for the configurations shown in Table 2.

TABLE 2

| Packet size | 1050 (bytes) |
|---|---|
| packet loss rate (i.e. packet loss rate) | 2% |
| Repair packet rate | 4% (1 repair packet for every 25 source packets) |
| Stream used | Stream 1 |

Figure 6A:
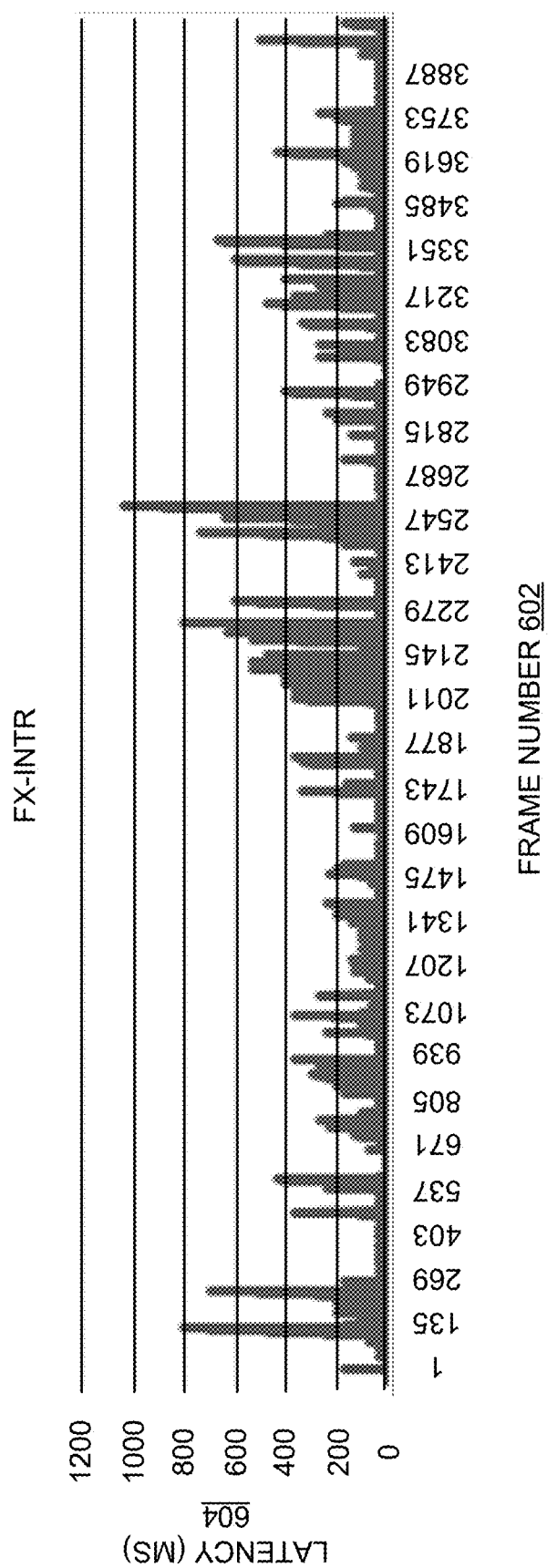
FIG. 6A shows an example graphical representation of latency across frames with regular interleaving of repair packets.

FIG. 6A shows an example graphical representation of latency across frames with regular interleaving of repair packets (i.e., FX-INTR). In FIGS. 6A to 6G, x-axis represents frame number 602 and y-axis represents latency 604. FIG. 6A shows a simulation of latencies encountered when the repair packets are interleaved at a regular interval without being media aware (i.e., the repair packets are not guaranteed to be at the end of frames). As shown in FIG. 6A, the latencies encountered across frames are mostly random and unbounded.

Figure 6B:
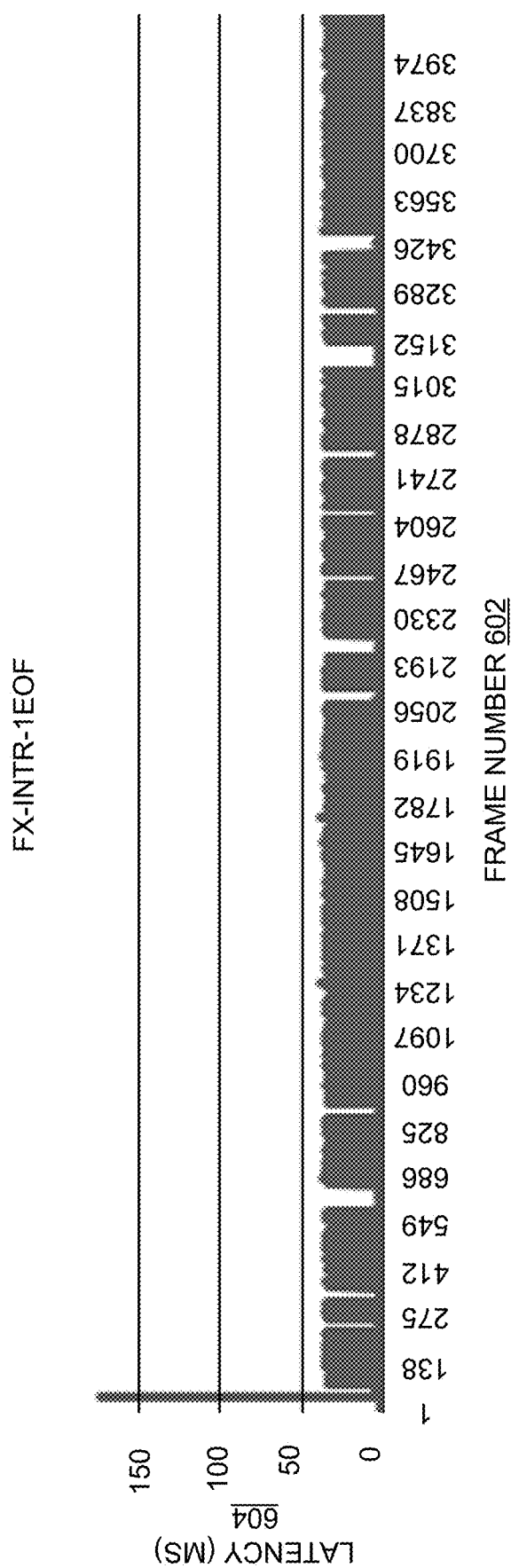
FIG. 6B shows an example graphical representation of the latency across frames with regular interleaving of repair packets plus repair packets at an end of each frame.

FIG. 6B shows an example graphical representation of the latency across frames with regular interleaving of the repair packets plus repair packets at end of each frame (i.e., FX-INTR-1EOF). Unlike in FIG. 6A, FIG. 6B shows a simulation of latencies encountered when the repair packets are placed in a media aware way (i.e., the repair packets are placed at the end of every frame) apart from adding the repair packets at regular intervals. As shown in FIG. 6B, the latencies encountered are significantly contained within a bound of about one frame latency (i.e., 33 ms).

Figure 6C:
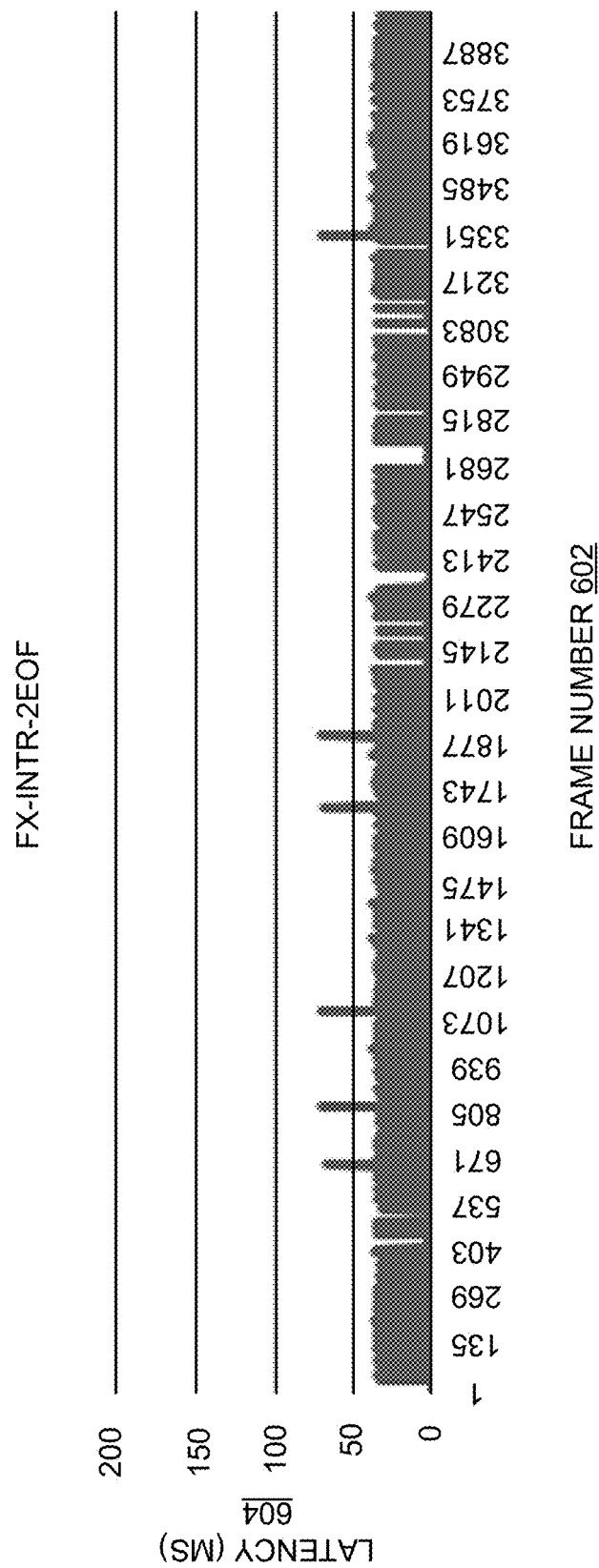
FIG. 6C shows an example graphical representation of the latency across frames with regular interleaving of repair packets at an end of every 2 frames.

FIG. 6C shows an example graphical representation of the latency across frames with regular interleaving of the repair packets at end of every 2 frames (i.e., FX-INTR-2EOF). FIG. 6C indicates another view of media aware repair packet placement but at a lower rate i.e., the repair packets are placed at end of every 2 frames with additional repair packets placed at regular intervals. In this example, the maximum latency may be bounded within 2 frames (i.e., 66 ms).

Figure 6D:
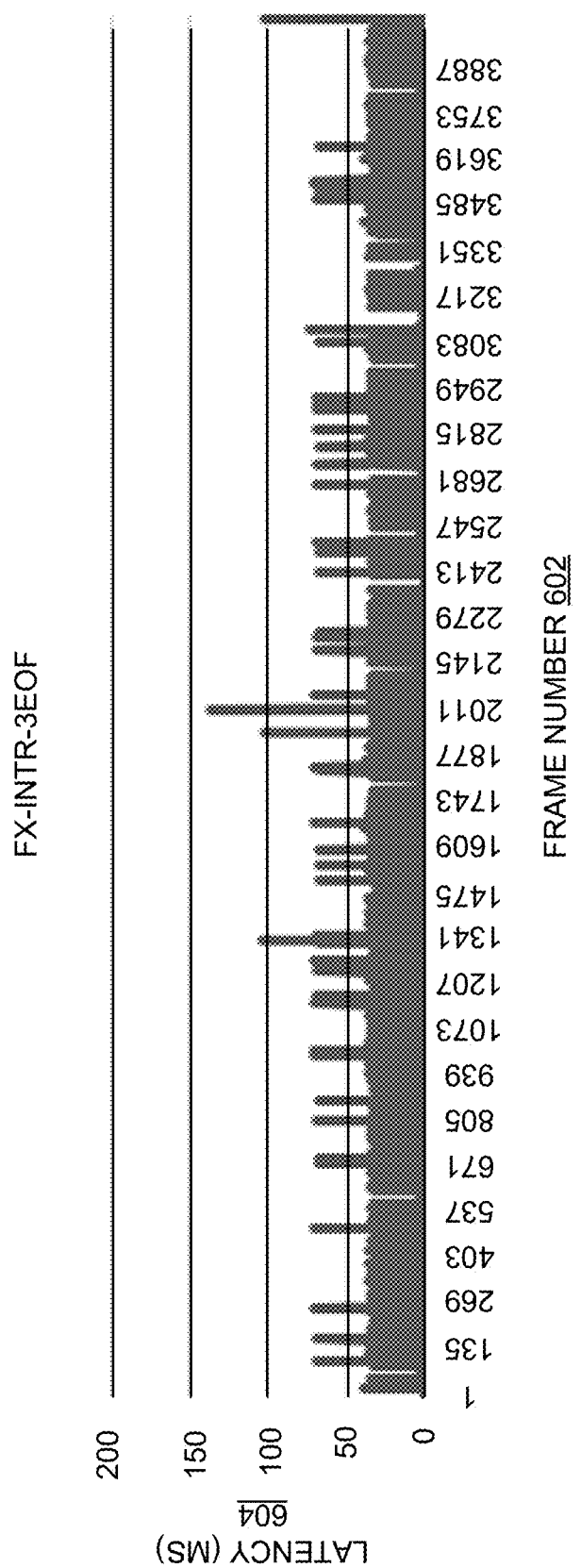
FIG. 6D shows an example graphical representation of the latency across frames with regular interleaving of repair packets at an end of every 3 frames.

FIG. 6D shows an example graphical representation of the latency across frames with regular interleaving of the repair packets at end of every 3 frames (i.e., FX-INTR-3EOF). FIG. 6D indicates another view of media aware repair packet placement but at a further lower rate i.e., the repair packets placed at end of every 3 frames with additional repair packets placed at regular intervals. In this example, the maximum latency may be bounded within 3 to 4 frames (i.e., 99 to 132 ms).

Figure 6E:
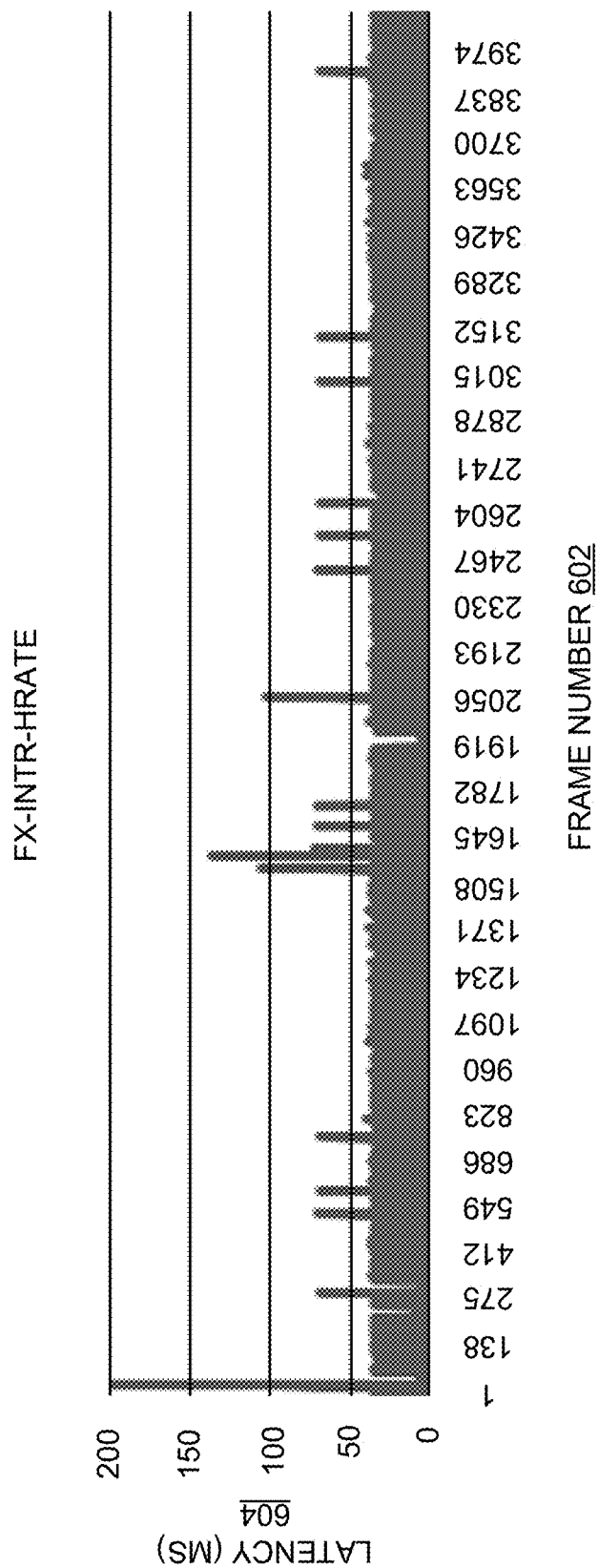
FIG. 6E shows an example graphical representation of the latency across frames with regular interleaving of repair packets at a rate equal to the repair packets at an end of every frame.

FIG. 6E shows an example graphical representation of the latency across frames with regular interleaving of the repair packets at rate equal to the repair packets at end of every frame (i.e., FX-INTR-HRATE). FIG. 6E shows benefits of media aware placement vis-à-vis no media aware placement. As compared to FIG. 6B, the repair packets may be placed at a regular interval but at a higher rate that is equal to placing repair packets at regular interval plus repair packets at end of every frame (FX-INTR-1EOF). For same repair packet rate, FIG. 6E depicts higher latencies compared to a scenario when repair packets are placed at end of every frame. Here, the latency can be seen to be as high as 4 frames.

Figure 6F:
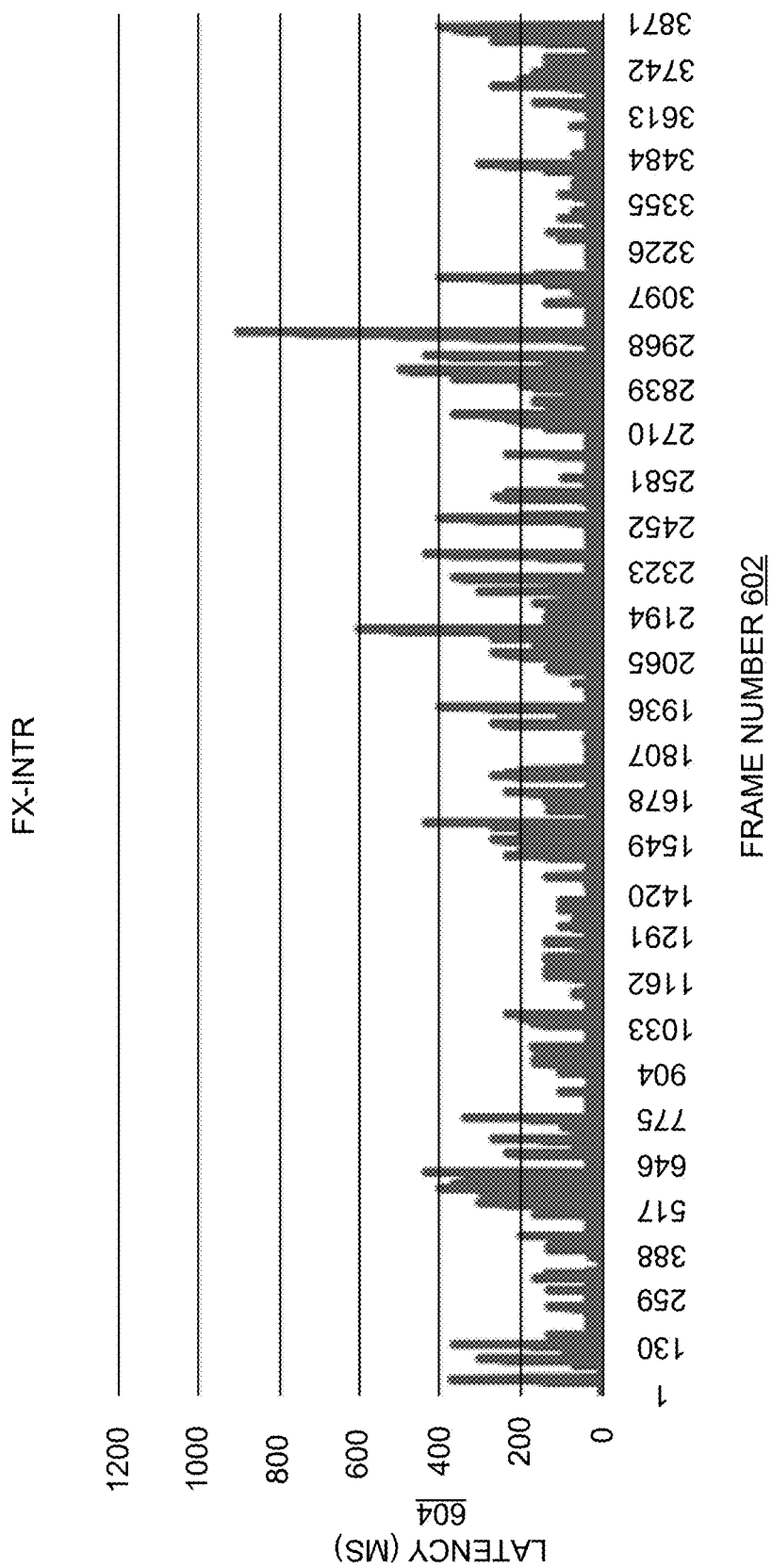
FIG. 6F shows an example graphical representation of the latency across frames with regular interleaving of repair packets.
Figure 6G:
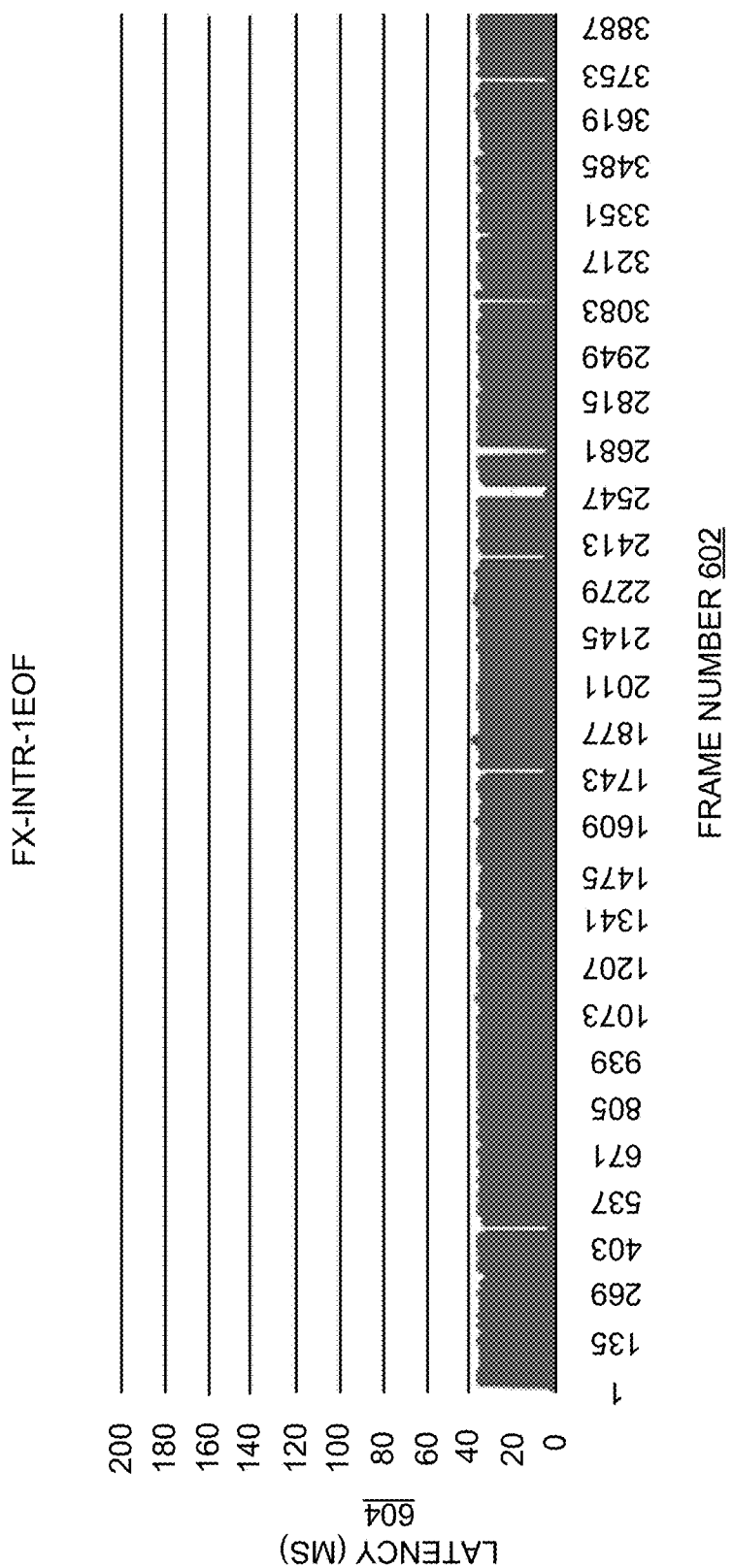
FIG. 6G shows an example graphical representation of the latency across frames with regular interleaving of repair packets plus the repair packets at an end of every frame.

FIG. 6F shows an example graphical representation of the latency across frames with regular interleaving of the repair packets (i.e., FX-INTR). FIG. 6G shows an example graphical representation of the latency across frames with regular interleaving of repair packets plus the repair packets at the end of every frame (i.e., FX-INTR-1EOF). FIGS. 6F and 6G indicate the latency for different placement of the repair packets for the configurations shown in Table 3.

TABLE 3

| Packet size | 500 (bytes) |
|---|---|
| Packet loss rate | 2% |
| Repair packet rate | 4% (1 repair packet for every 25 source packets) |
| Stream used | stream 1 |

Further, FIGS. 6F and 6G exhibit behaviors similar to FIGS. 6A and 6B, respectively but for a packet size of 500 (instead of 1050). The graphical representations of FIGS. 6A and 6B show that the latency behavior on placement of the repair packets is similar across different packet sizes.

Figure 7A:
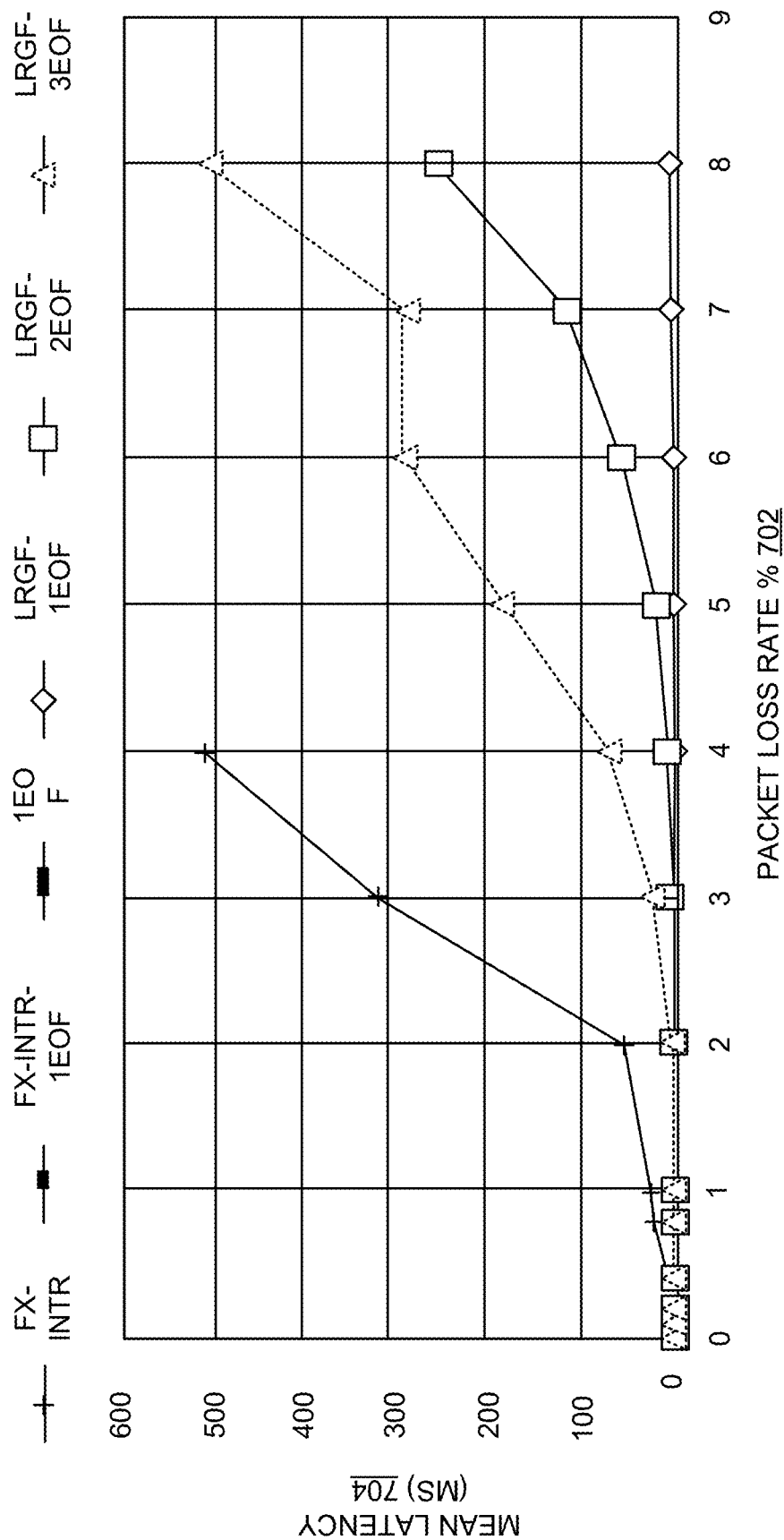
FIG. 7A shows an example graphical representation of a mean latency variation across packet loss rates for different configurations.
Figure 7B:
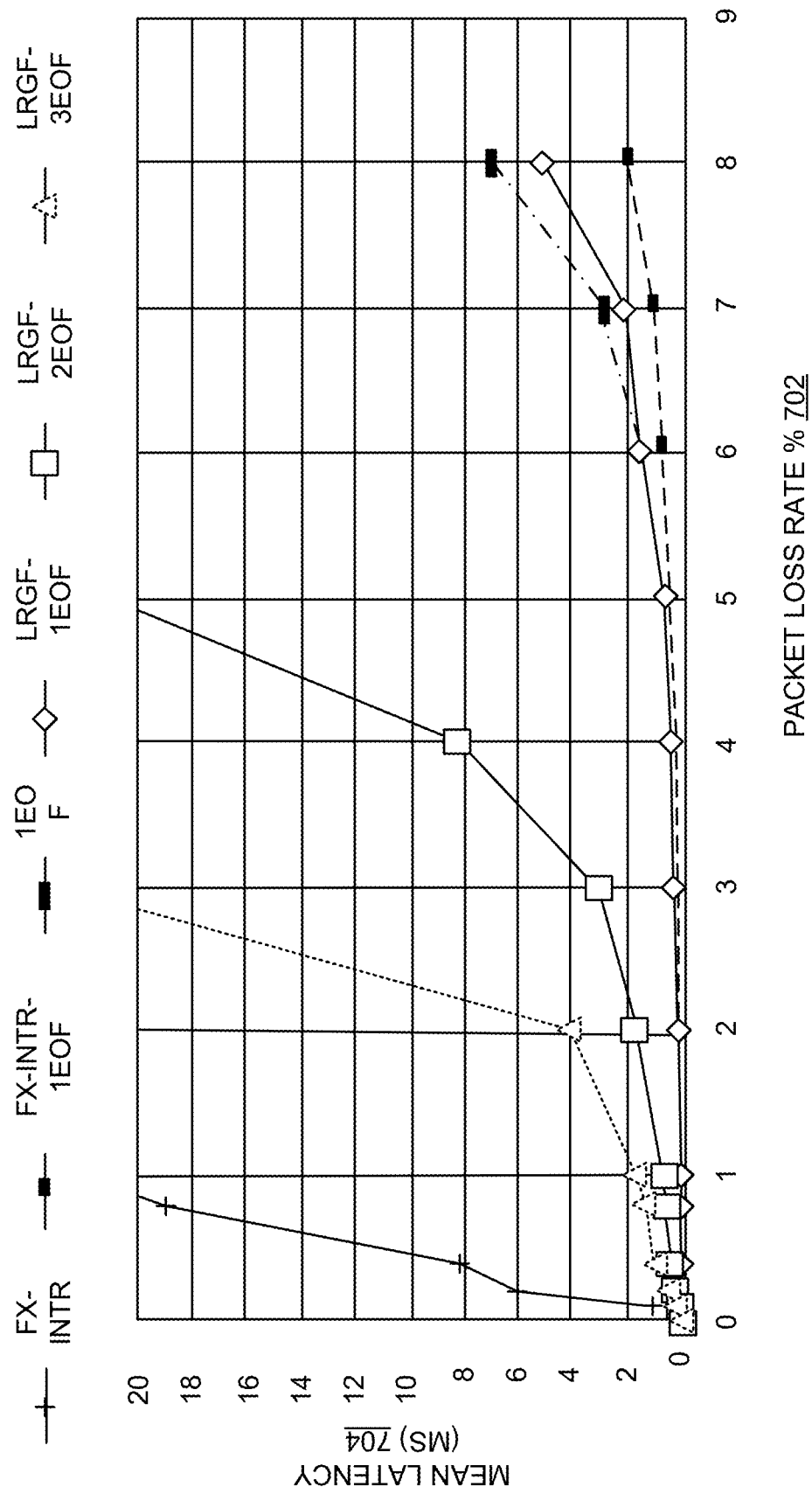
FIG. 7B shows an example graphical representation of zoomed-in view of FIG. 7A for graphs showing the mean latency distribution for certain configurations.
Figure 7C:
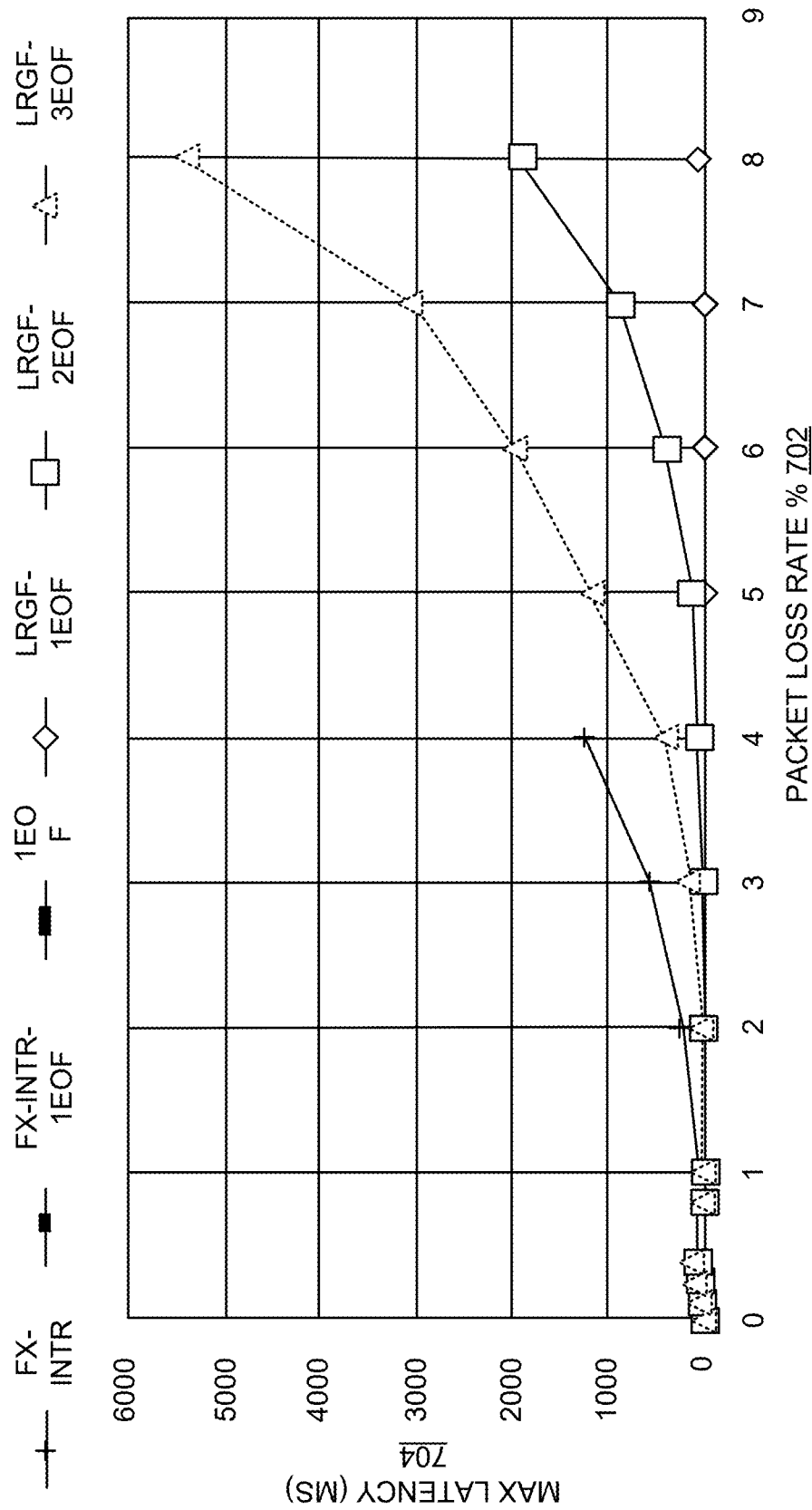
FIG. 7C shows an example graphical representation of a maximum latency variation across packet loss rates for various configuration of repair packet placements.
Figure 7D:
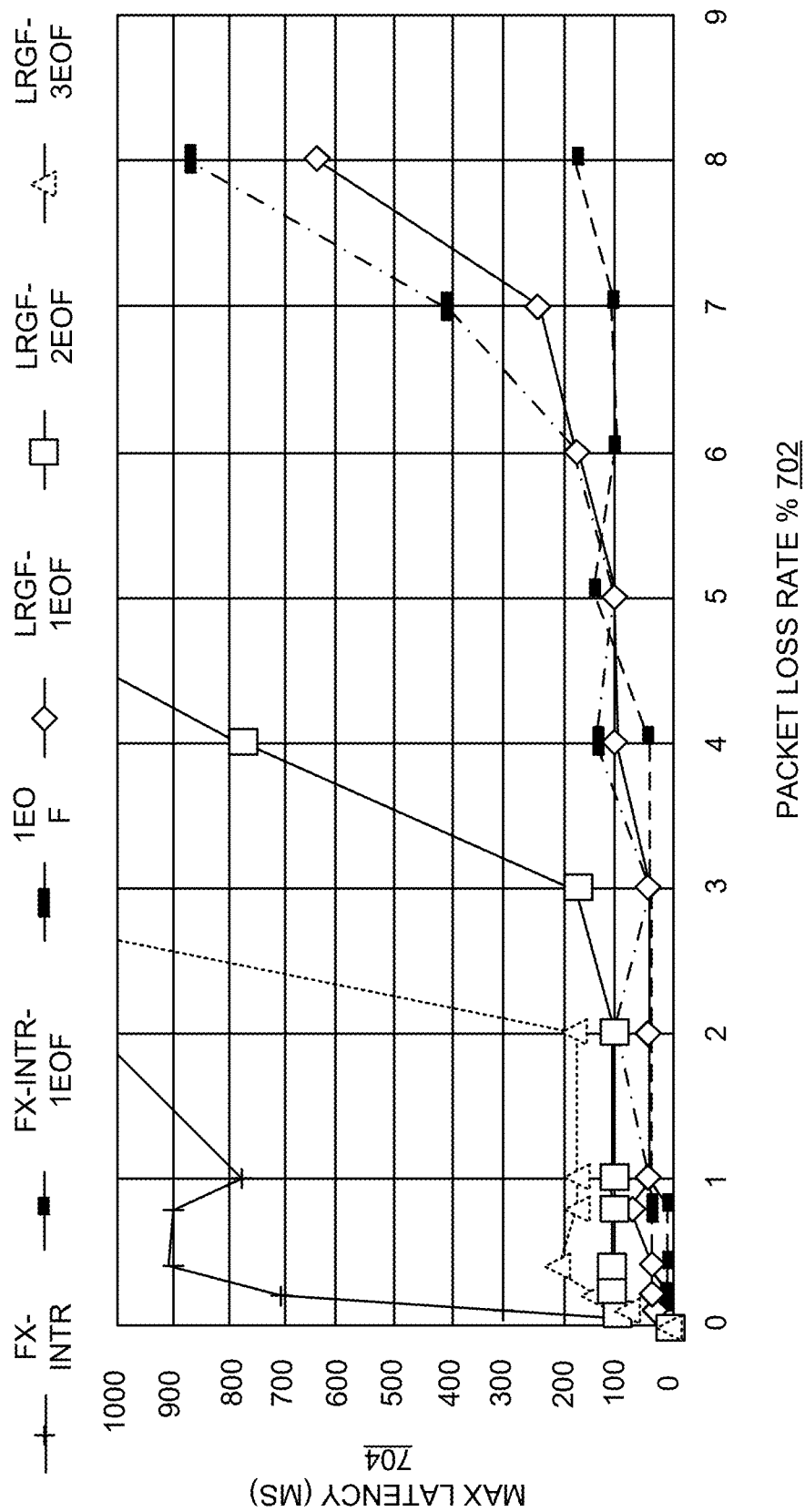
FIG. 7D shows an example graphical representation of zoomed-in view of the graph in FIG. 7C depicting a maximum latency distribution for certain configurations.

FIG. 7A shows an example graphical representation of a mean latency variation across packet loss rates for various configurations. FIG. 7B shows an example graphical representation of zoomed in view of FIG. 7A for graphs showing the mean latency distribution for certain configurations. FIG. 7C shows an example graphical representation of a maximum latency variation across the packet loss rates for various configuration of repair packet placements. FIG. 7D shows an example graphical representation of zoomed in view of FIG. 7C graph depicting the maximum latency distribution for certain configurations. In FIGS. 7A to 7D, x-axis represents a percentage of a packet loss rate 702 and y-axis represents a mean latency 704. The example graphs in FIGS. 7A to 7D indicate the latency variation for different placement of repair packets for the configurations shown in Table 4.

TABLE 4

| | |
|---|---|
| Packet size | 500 (bytes) |
| Packet loss rate | 0, 0.1. 0.2, 0.4, 0.8, 1, 2, 3, 4, 5, 6, 7, 8% |
| Repair packet rate | 4% (1 repair packet for every 25 source packets) |
| Stream used | stream 1 |

Further, FIGS. 7A to 7D show the pattern for latency (i.e., mean as well as maximum) across increasing packet loss rate for each of the configurations. As shown in FIGS. 7A to 7D, the slope of the curve changes more sharply at different loss rates for different configurations leading to rapid buildup in latency values (i.e., mean as well as max) at different loss rates for different configurations. Thus, the latency may be a function of video-aware placement of the repair packets as well as the density of generic interleaved repair packets.

Observations

TABLE 5

| Packet loss rate (%) | Frame latency (ms) | | | Overheads % (# of repair-packets/# of Source-packets) |
|---|---|---|---|---|
| | Mean | Std. dev | Max | |
| Fixed interval repair packets (FX-INTR) | | | | |
| 0.1 | 0.68 | 0.00 | 137 | 4.00 |
| 0.2 | 1.98 | 14.14 | 304 | 4.00 |
| 0.4 | 3.49 | 14.14 | 237 | 4.00 |
| 0.8 | 6.85 | 24.49 | 305 | 4.00 |
| 1 | 8.02 | 24.49 | 304 | 4.00 |
| 2 | 24.00 | 55.68 | 739 | 4.00 |
| 3 | 138.61 | 232.59 | 2651 | 4.00 |
| 4 | 508.37 | 435.78 | 2143 | 4.00 |
| End of frame (EOF) repair packets with multiple repair packets for large frames (LRGF-1EOF) | | | | |
| 0.1 | 0.00 | 0.00 | 7 | 8.03 |
| 0.2 | 0.02 | 0.00 | 37 | 8.03 |
| 0.4 | 0.02 | 0.00 | 37 | 8.03 |
| 0.8 | 0.02 | 0.00 | 37 | 8.03 |
| 1 | 0.14 | 0.00 | 129 | 8.03 |
| 2 | 0.28 | 0.00 | 50 | 8.03 |
| 3 | 1.82 | 10.00 | 185 | 8.03 |
| 4 | 9.87 | 46.90 | 734 | 8.03 |
| Repair packets at end of every 2 frames with multiple repair packets for large frames (LRGF-2EOF) | | | | |
| 0.1 | 0.18 | 0.00 | 76 | 5.17 |
| 0.2 | 0.43 | 0.00 | 104 | 5.17 |
| 0.4 | 0.63 | 0.00 | 107 | 5.17 |
| 0.8 | 1.21 | 0.00 | 108 | 5.17 |
| 1 | 1.49 | 0.00 | 105 | 5.17 |
| 2 | 4.59 | 14.14 | 238 | 5.17 |
| 3 | 27.36 | 97.47 | 1569 | 5.17 |
| 4 | 181.58 | 328.02 | 5140 | 5.17 |

Table 5 depicts an example latency variation across packet loss rates for different error correction repair packet configurations. Table 5 depicts the details of the latencies encountered across various packet loss rates for different packet placement configurations. From Table 5, it can be observed that the latency encountered is minimized as the repair packets are added at the end of the frame. The latency shows an increase as per the change in the configuration from the repair packets at end of every frame to repair packets at end of every 2 frames. The latency and overheads listed in Table 5 are generated for a fixed configuration packet size of 1050 bytes and Stream 3.

Figure 8A:
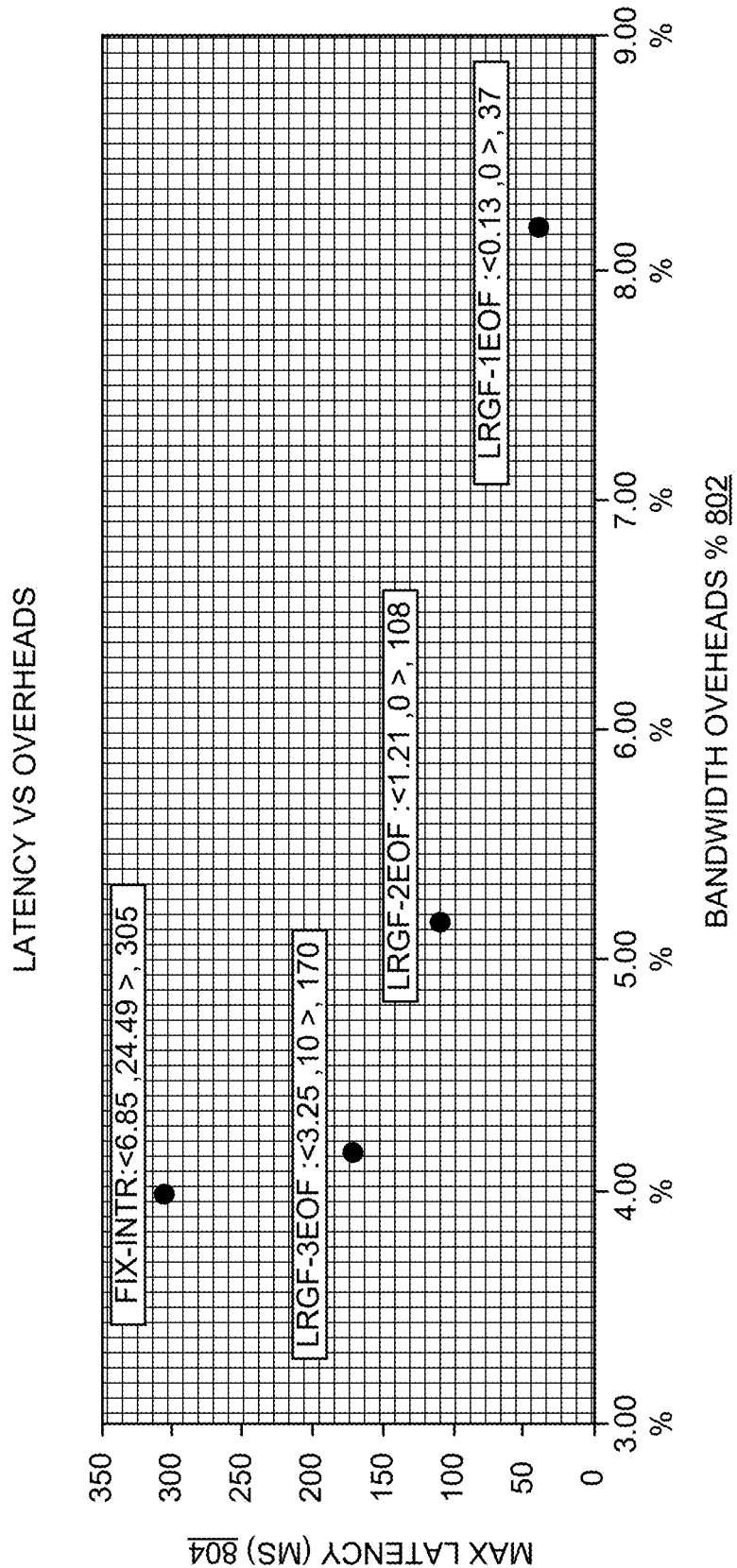
FIG. 8A shows an example graphical representation of a latency as a function of repair packet placements.
Figure 8B:
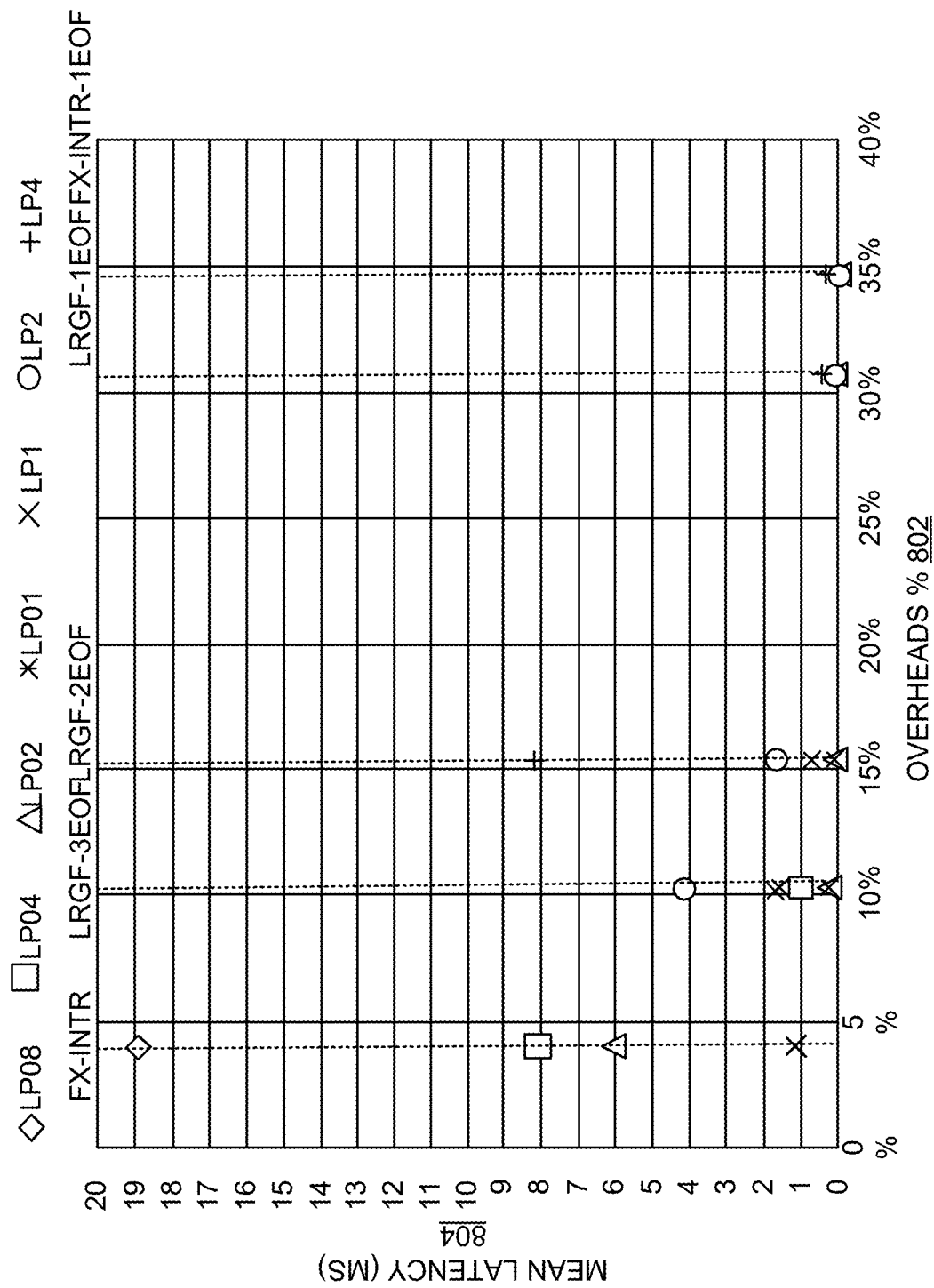
FIG. 8B shows an example graphical representation depicting a latency analysis for different repair packet placement across varying packet loss rate.

FIG. 8A shows an example graphical representation of latency as a function of repair packet placements. In FIGS. 8A and 8B, x-axis represents a percentage of bandwidth overheads 802 and y-axis represents a maximum latency 804. FIG. 8A indicates maximum latency distribution (e.g., with mean and standard deviation in angle brackets) across various configurations of repair packet placement. FIG. 8A shows that having the repair packets at frame boundaries facilitate to reduce the overall latency. However, the placement of repair packets in a media (or frame) aware manner may also lead to higher bandwidth overheads compared to regular interval placement. For example, parameters shown below in Table 6 are used in generating FIG. 8A.

TABLE 6

| | |
|---|---|
| Packet size | 1050 (bytes) |
| Packet loss rate | 0.8% |
| Repair packet rate | 4% |

As shown in FIG. 8A, frame aware placement of repair packets decreases latency, but increases bandwidth overhead due to introduction of additional repair packets at end of the frames. This trend is seen across various streams and for different configurations as well. The overheads encountered are also dependent on the stream bitrate (i.e., source packets per second).

FIG. 8B shows an example graphical representation depicting latency analysis for different repair packet placement across varying packet loss rate. FIG. 8B depicts an alternative view of FIGS. 7A to 7D. As shown in FIG. 8B:

LP01 = Packet loss rate of 0.1%, LP02 = Packet loss rate of 0.2%
LP04 = Packet loss rate of 0.4%, LP08 = Packet loss rate of 0.8%
LP1 = Packet loss rate of 1%, LP2 = Packet loss rate of 2%
LP4 = Packet loss rate of 4%, LP8 = Packet loss rate of 8%

Further, dotted lines in FIG. 8B may indicate the overheads that correspond to a configuration. This configuration used a lower bitrate stream (i.e., Stream 1) and therefore the overheads encountered are on the higher side and atypical. Thus, the overheads encountered may be a function of placement of repair packets. Also, the latency encountered may be a function of the repair packets placement as well as the error correcting capacity of the network coding (e.g., using RLNC) at a given packet loss rate.

As shown in FIG. 8B, the maximum latency of the recovered packets may be dependent on placement of the repair packets as well as repair packet rate (which in turn is proportional to packet loss rate). Therefore, the joint optimal solution of meeting minimal latency and overheads may need placement of repair packets not only at a rate sufficient to recover lost packets, but also at the right positions i.e., end of frame, end of every two frames, or other positions within large frames, in the coded stream.

Figure 9:
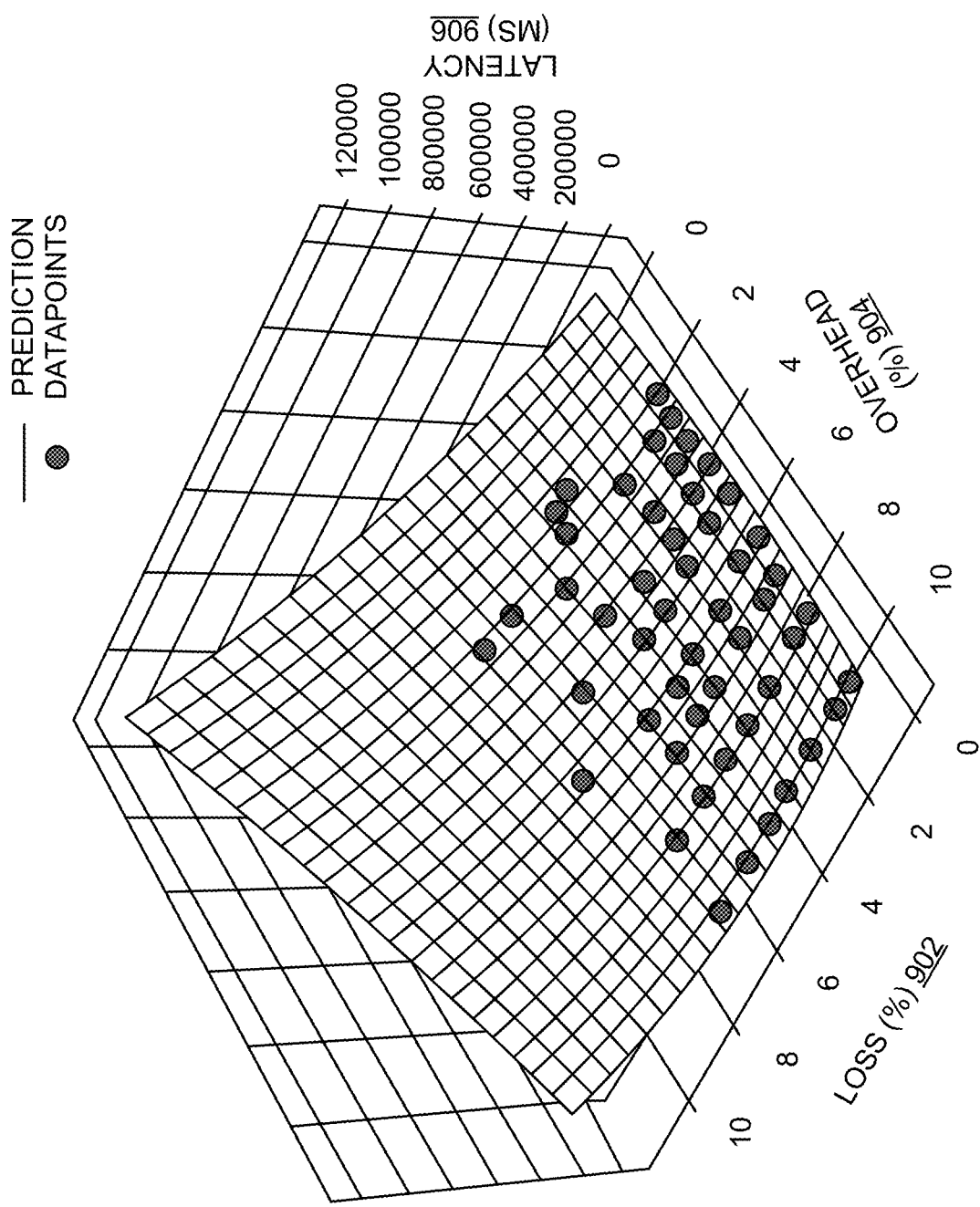
FIG. 9 shows an example graphical representation depicting a joint visualization of packet loss rate, an overhead, and a latency for an LRGF-2EOF case.

FIG. 9 shows an example graphical representation depicting a joint visualization of a packet loss rate 902, an overhead 904, and a latency 906 for a LRGF-2EOF case. For example, an empirical rule-based method or a machine level-based method can be used to develop such models across big data (i.e., various configurations, video streams, and the like). Further. such models can facilitate in finding near-optimal values for latency and overhead for a given packet loss rate.

In some examples, the network coding (e.g., using RLNC) may be implemented at an application layer, with underlying UDP. The UDP is conductive to live-streaming, video conferencing, WebRTC, and the like as described below.

Use Case 1: WebRTC

Figure 10:
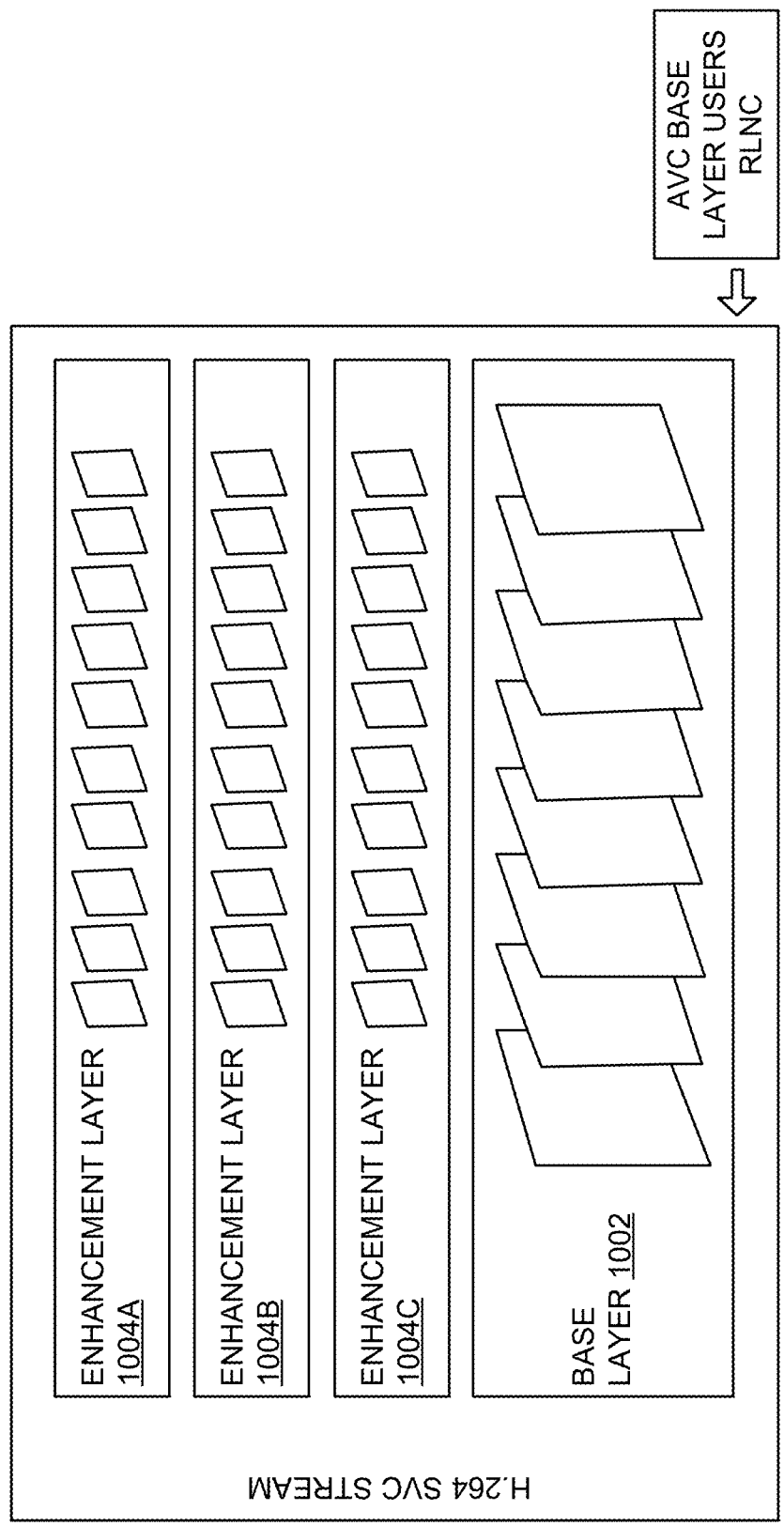
FIG. 10 is a block diagram depicting an example scalable video coding (SVC), where a base layer is protected using network coding (e.g., RLNC)

FIG. 10 is a block diagram depicting an example scalable video coding (SVC), where a base layer 1002 is protected using the network coding (e.g., RLNC). The SVC uses base layer 1002 and one or more enhancement layers 1004A to 1004C to produce scalable version of the encoded video stream (e.g., H.264 SVC stream). SVC base layer 1002 encodes the lowest temporal, spatial, and quality representation of the video stream. Enhancement layers 1004A to 1004C use a base advanced video coding (AVC) layer as a starting point, and can be used to convey higher quality, resolution, or temporal versions of the video.

It is known that there is an SVC extension specifically intended for WebRTC. An example base layer 1002 of SVC can be AVC, for which the network coding (e.g., using RLNC) mechanisms can be simulated. By decoding the base layer and only the subsequent enhancement layers required, a decoder can produce a video stream with certain desired characteristics.

The simulation has performed key data analysis for video streaming using UDP, and extension of this work would lead to a recommendation engine for the right configuration for the RLNC towards joint optimization of latency and bandwidth overhead for a given packet loss rate. This work can readily form the basis for a WebRTC product as described further now. For a WebRTC use-case, unequal protection schemes can be envisioned such that the base layer is protected using the RLNC. The enhancement layers depend on reliable transmission of the base layer and hence the prioritized protection of the base layer. The enhancement layers of course, may optionally use the RLNC as per need. The RLNC can be parameterized separately for the audio considering the near-CBR nature of audio packets, and their characteristic frame sizes which are markedly different from those of the video frames. The audio packets may additionally be protected with prioritized network protection protocols, given the latency sensitivity of audio.

Use Case 2: Video Conferencing and Collaboration

This use-case is an important example of video delivery over the UDP as the use-case being highly latency and bandwidth sensitive. The video delivery occurs over multi-hop network configurations and multiple source/destinations. It may involve intermediate modules like a microcontroller (MCU) and a selective forwarding unit (SFU), and in complex cases, multi-path routing as well.

In addition, while the experiments did not cover the aspect of using a shared/bottleneck link (like in a 'butterfly' network) as an essential component, it should be noted that the RLNC specifically has the advantage of optimizing the information flow and bandwidth usage for such 'butterfly' networks. In the collaboration use case, multiple video streams from different users can be dynamically combined using the RLNC advantageously.

Use Case 3: Low Latency Video Streaming

For any multimedia based interactive application like gaming, the end-to-end low latency (of the order of a few tens of milliseconds) is a strict requirement. This often requires special design of server and client pipeline to minimize the amount of buffering across data acquisition, processing, and transmission. Also, it may also involve special handling of the video access units to be split further into smaller constructs such as slices (and the like) and enable parallel processing to minimize the overall latency. In a lossy network scenario, with these low latency design constraints, audio/video quality issues become very prominent and difficult to handle. Moreover, a transmission control protocol (TCP) based streaming, which can ensure no-loss recovery of packets, is ruled out for sending the main payload data, because of the latency requirements. TCP can be used, at best, to send control messages pertaining to the session, since these are not as latency-sensitive. The use of UDP would imply lower latency and also with associated packet losses to be dealt with, given that it lacks the reliability of TCP. One typical approach to reduce the impact on video quality is to employ live adaptive bitrate streaming such that packet loss can be minimized. However, when the network is shared by various other sessions/clients, whatever bandwidth is given up by the streaming session may be over-utilized by the other sessions. This does not bring in much improvement to the overall video quality of the streaming session. The network coding (e.g., using RLNC) can help in this problem space. Using on-the-fly RLNC encode, with self-adaptive encode window, can provide protection for the lost packets. This RLNC scheme would function much better than one where the video quality ends up getting sacrificed by inducing a reduction of bitrate of the multimedia content.

Use Case 4: Forward Looking Use-Cases Over HTTP/TCP

Figure 11:
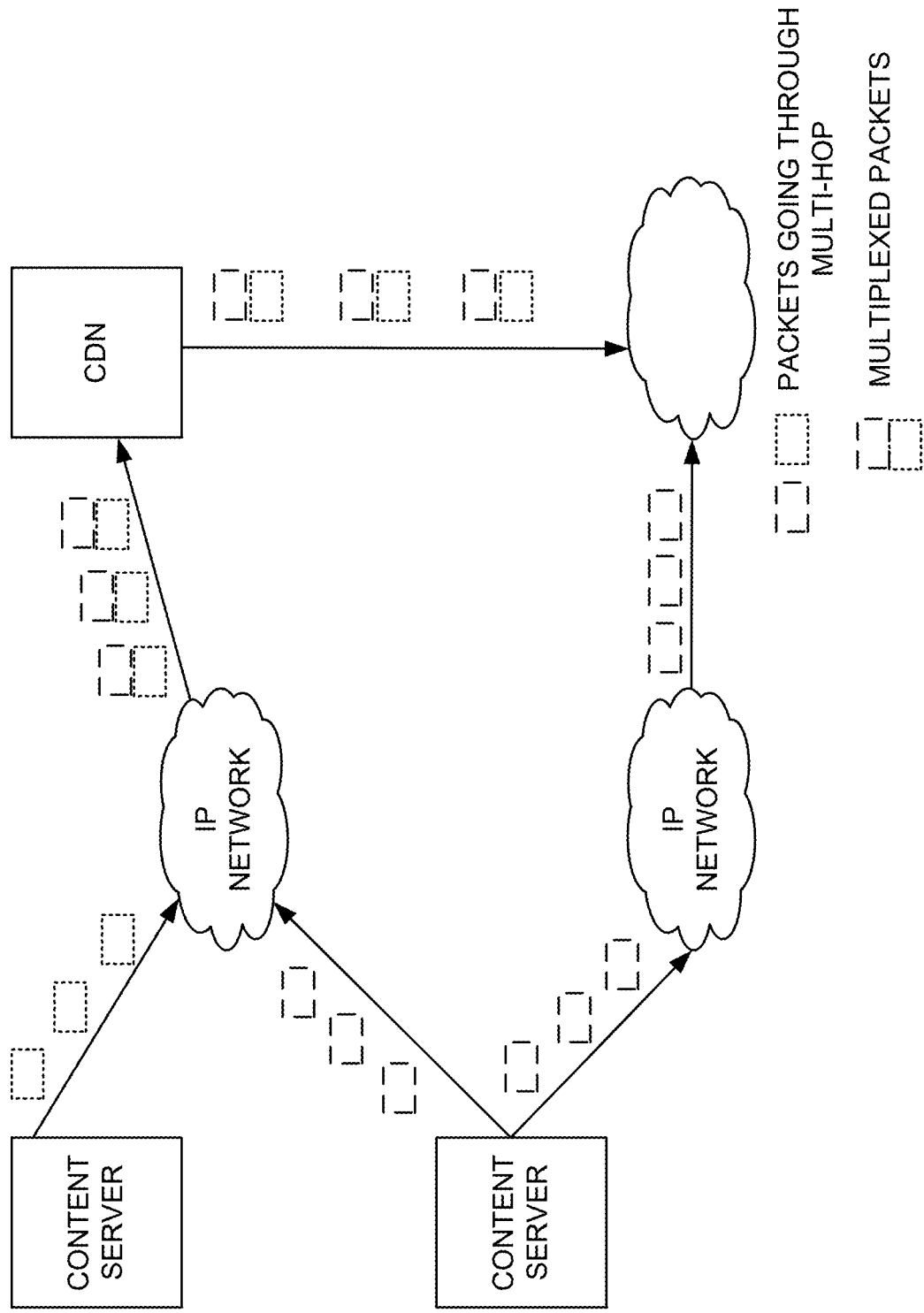
FIG. 11 is a block diagram of example multi-path and multi-hop scenario depicting network coded (e.g., RLNC) packets.

FIG. 11 is a block diagram of example multi-path and multi-hop scenario depicting RLNC packets. Over-the-top (OTT) video delivery involves several use-cases such as adaptive bitrate streaming (ABR-such as MPEG-DASH or HLS), progressive download-based delivery, which use a hypertext transfer protocol (HTTP)/transmission control protocol (TCP). The findings can fundamentally benefit this space as well. However, it would be involved to implement the RLNC at the transport layer involving the TCP stack.

Further, OTT use-cases involve heterogeneous networks, a multi-hop, a multi-path, a multi-source/destination. The RLNC may be suited for these use cases. Additionally, the bandwidth optimization aspect (exemplified by the butterfly network) of the RLNC can be used to dynamically multiplex several video streams, potentially from multiple video sources delivered over multiple paths. In some OTT use-cases, this would imply that related segments of a specific content are being streamed from different video sources like CDNs, using HTTP based adaptive streaming protocols. In such cases, the client streams these from different sources but does the necessary processing to decode and render the video in a logical order. More advanced and future looking use-cases could also look at delivery of multiplexing of different contents from different sources over different paths in a decentralized network. This is in some ways analogous to multiplexing several single program transport streams (SPTS) into a multiple program transport stream (MPTS). That said, future OTT use-cases can be far more dynamic since the streams could change in response to user requests over time. There are other dynamic elements, for instance, dynamic patterns of users tuning in, and tuning out of the OTT streams, time-of-day, varying channel bandwidth conditions over the day/in-time. In some cases, network coded video can coexist with encryption mechanisms, where both of them are handled by respective modules (e.g., decryption engine and NC (network code) decoder).

Some or all of the system components and/or data structures may also be stored as contents (e.g., as executable or other computer-readable software instructions or structured data) on a non-transitory computer-readable medium (e.g., as a hard disk; a computer memory; a computer network or cellular wireless network or other data transmission medium; or a portable media article to be read by an appropriate drive or via an appropriate connection, such as a DVD or flash memory device) so as to enable or configure the computer-readable medium and/or one or more host computing systems or devices to execute or otherwise use or provide the contents to perform at least some of the described techniques.

The above-described examples are for the purpose of illustration. Although the above examples have been described in conjunction with example implementations thereof, numerous modifications may be possible without materially departing from the teachings of the subject matter described herein. Other substitutions, modifications, and changes may be made without departing from the spirit of the subject matter. Also, the features disclosed in this specification (including any accompanying claims, abstract, and drawings), and/or any method or process so disclosed, may be combined in any combination, except combinations where some of such features are mutually exclusive.

The terms "include," "have," and variations thereof, as used herein, have the same meaning as the term "comprise" or appropriate variation thereof. Furthermore, the term "based on," as used herein, means "based at least in part on." Thus, a feature that is described as based on some stimulus can be based on the stimulus or a combination of stimuli including the stimulus. In addition, the terms "first" and "second" are used to identify individual elements and may not meant to designate an order or number of those elements.

The present description has been shown and described with reference to the foregoing examples. It is understood, however, that other forms, details, and examples can be made without departing from the spirit and scope of the present subject matter that is defined in the following claims.

What is claimed is:

1. A method for delivering a multimedia data stream comprising:
    determining a frequency for generating one or more repair packets and a placement for positioning the one or more repair packets in the multimedia data stream based on a configuration parameter related to the multimedia data stream, wherein the frequency and the placement are determined based on a priority derived from a multimedia delivery use-case;
    generating the one or more repair packets by network coding source packets of the multimedia data stream based on the determined frequency and the placement; and
    transmitting, by a transmitting device, the network coded multimedia data stream with the repair packets to a receiving device.

2. The method of claim 1, further comprising:
    receiving a feedback message from the receiving device, the feedback message including packet loss rate information, decoded-video quality metric, or both; and
    determining a modified frequency for generating the one or more repair packets and/or a modified placement for positioning the one or more repair packets in a multimedia data stream based on the packet loss rate information, the decoded-video quality metric, or both.

3. The method of claim 2, wherein generating the one or more repair packets comprises:
    increasing the number of generated repair packets when the decoded-video quality metric is less than a specific threshold.

4. The method of claim 1, wherein determining the placement for positioning the one or more repair packets in the multimedia data stream comprises:
    determining the placement for positioning the one or more repair packets at an end of every n pictures, wherein n is an integer starting from 1, and wherein each picture comprises a slice or a frame.

5. The method recited in claim 1, wherein determining the placement for positioning the one or more repair packets in the multimedia data stream comprises:
    determining the placement for positioning the one or more repair packets in a content-aware manner based on a choice of an interleaving pattern of the one or more repair packets with the source packets.

6. The method of claim 1, wherein the configuration parameter related to the multimedia data stream comprises a data rate of the multimedia data stream, a bit rate of the multimedia data stream, a frame rate of the multimedia data stream, a packet size, a repair packet size, a target latency, a target bandwidth, a packet loss rate between the transmitting device and the receiving device, or any combination thereof.

7. The method of claim 1, wherein determining the frequency and placement for positioning the one or more repair packets based on the configuration parameter comprises:
    generating a mapping function between a data rate of the multimedia data stream, a bit rate of the multimedia data stream, a frame rate of the multimedia data stream, a packet loss rate between the transmitting device and the receiving device, a repair packet size, a target latency, a target bandwidth, an upper bound on encoding complexity, and an upper bound on a decoding complexity; and
    determining the frequency for generating one or more repair packets and the placement for positioning the one or more repair packets by optimizing one or more of a latency, a bandwidth, an encoding complexity, and a decoding complexity based on the mapping function.

8. The method of claim 7, wherein generating the mapping function comprises:
    generating the mapping function by applying a machine learning model to the data rate of the multimedia data stream, the bit rate of the multimedia data stream, the frame rate of the multimedia data stream, the packet loss rate, and the repair packet size based on the priority, the target latency, the target bandwidth, the upper bound on encoding complexity, and the upper bound on decoding complexity, wherein the machine learning model is selected from models across big data involving various network coding configurations and multimedia data streams.

9. The method of claim 8, wherein the machine learning model comprises a deep neural network, a radial basis function neural network, a wavelet basis function neural network, a multilayer perceptron, a support vector machine, a support vector regression machine, or any combination thereof.

10. The method of claim 8, wherein the machine learning model comprises a reinforcement learning, a deep reinforcement learning, a backpropagation algorithm, or any combination thereof.

11. The method of claim 8, wherein the machine learning model determines the frequency and the placement by optimizing one or more of the latency, the bandwidth, the encoding complexity, and the decoding complexity based on a selection of configuration parameters related to the multimedia data stream using a random forest algorithm.

12. The method of claim 1, wherein determining the frequency for generating the one or more repair packets comprises:
   determining a fixed repair packet rate for generating the one or more repair packets based on the configuration parameter.

13. The method of claim 1, determining the placement for positioning the one or more repair packets in the multimedia stream comprises:
   computing a bandwidth overhead for placing the one or more repair packets for a given latency based on the priority between a bandwidth and a latency; and
   determining the placement for positioning the one or more repair packets at an end of an integral number of pictures based on the computed bandwidth overhead.

14. The method of claim 1, determining the placement for positioning the one or more repair packets in the multimedia stream comprises:
   computing a latency for placing the one or more repair packets for given bandwidth based on the priority between a bandwidth and a latency; and
   determining the placement for positioning the one or more repair packets at an end of an integral number of pictures based on the computed latency.

15. The method of claim 1, wherein generating the one or more repair packets comprises:
   generating the one or more repair packets to provide an unequal protection for different audio channels of the multimedia data stream.

16. The method of claim 1, wherein generating the one or more repair packets comprises:
   generating the one or more repair packets to provide an unequal protection for different video coding layers of the multimedia data stream.

17. The method of claim 1, wherein the multimedia data stream use-case comprises a Web Real-Time Communication (WebRTC), a Low latency multimedia streaming, a video conferencing and collaboration, or an over-the-top multimedia delivery.

18. The method of claim 1, wherein the priority associated with the multimedia data stream use-case comprises a priority between a latency and a bandwidth based on a network connection type, a communication type, a network topology, a network path characteristic, or any combination thereof.

19. The method of claim 1, wherein the said network coding can be performed in one or more of the following configurations:
   (a) Systematic or non-systematic;
   (b) Sparse or dense; and
   (c) Block or adaptive.

20. The method of claim 1, wherein generating the one or more repair packets comprises:
   receiving, from a video encoder of the transmitter, information associated with one or more of: human visual system (HVS) perceptual parameters, spatial complexity, and temporal complexity associated with different parts of a video signal of the multimedia data stream; and
   generating the one or more repair packets to provide different protection for different parts of the video signal based on the received information from the video encoder.

21. The method of claim 1, wherein determining the placement for positioning the one or more repair packets in the multimedia data stream comprises:
   determining the placement for positioning the one or more repair packets at an end of every n fields when the multimedia data stream includes interlaced digital video, wherein n is an integer starting from 1.

22. The method of claim 1, wherein determining the placement for positioning the one or more repair packets in the multimedia data stream comprises:
   determining the placement for positioning the one or more repair packets at an end of every n wavefronts or n tiles of video data in the multimedia data stream, wherein n is an integer starting from 1.

23. The method of claim 1, wherein the source packets are non-network coded, network-coded, or a combination of both.

24. A communication device for delivering a multimedia data stream, the communication device comprising:
   an adaptation module to:
      receive a set of configuration parameters related to the multimedia data stream; and
      determine a frequency for generating one or more repair packets and a placement for positioning the one or more repair packets in the multimedia data stream based on the set of configuration parameters, wherein the frequency and the placement are determined based on a priority derived from a multimedia delivery use-case; and
   a transmitter communicatively connected to the adaptation module to:
      generate the one or more repair packets by network coding source packets of the multimedia data stream based on the determined frequency and the placement; and
      transmit the network coded multimedia data stream with the repair packets to a receiving device.

25. The communication device of claim 24, further comprising:
   a receiver to receive a feedback message from the receiving device, the feedback message including packet loss rate information, decoded-video quality metric, or both, wherein the transmitter is to determine a modified frequency for generating the repair packets and/or a modified placement for positioning the one or more repair packets in a multimedia data stream based on the packet loss rate information, decoded-video quality metric, or both.

26. The communication device of claim 24, wherein the adaptation module is to:
   generate a mapping function between a data rate of the multimedia data stream, a bit rate of the multimedia data stream, a frame rate of the multimedia data stream, a packet loss rate between the transmitting device and the receiving device, a repair packet size, a target latency, a target bandwidth, an upper bound on an encoding complexity, and an upper bound on a decoding complexity; and
   determine the frequency for generating the one or more repair packets and the placement for positioning the one or more repair packets by optimizing one or more of a latency, a bandwidth, an encoding complexity, and a decoding complexity based on the mapping function.

27. The communication device of claim 26, wherein the adaptation module is to:
   generate the mapping function by applying a machine learning model to the data rate of the multimedia data stream, the bit rate of the multimedia data stream, the frame rate of the multimedia data stream, the packet loss rate, the repair packet size, the target latency, the target bandwidth, the upper bound on encoding complexity, and the upper bound on decoding complexity based on the priority, wherein the machine learning model is selected from models across big data involving various network coding configurations and multimedia data streams.

28. The communication device of claim 24, wherein the transmitter is to:
compute a bandwidth overhead for placing the one or more repair packets for a given latency based on the priority between a bandwidth and a latency; and
determine the placement for positioning the one or more repair packets at an end of an integral number of pictures based on the computed bandwidth overhead.

29. The communication device of claim 24, wherein the transmitter is to:
compute a latency for placing the one or more repair packets for given bandwidth based on the priority between a bandwidth and a latency; and
determine the placement for positioning the one or more repair packets at an end of an integral number of pictures based on the computed latency.

30. A non-transitory computer-readable storage medium having instructions that, when executed by a processor of a communication device, cause the processor to:
determine a frequency for generating one or more repair packets and a placement for positioning the one or more repair packets in a multimedia data stream based on a configuration parameter related to the multimedia data stream, wherein the frequency and the placement are determined based on a priority derived from a multimedia delivery use-case;
generate the one or more repair packets by network coding source packets of the multimedia data stream based on the determined frequency and the placement; and
transmit the network coded multimedia data stream with the repair packets to a receiving device.

31. The non-transitory computer-readable storage medium of claim 30, further comprising instructions that, when executed by the processor of the communication device, cause the processor to:
receive a feedback message from the receiving device, the feedback message including packet loss rate information, decoded-video quality metric, or both, wherein a modified frequency is determined for generating the repair packets and/or a modified placement for positioning the one or more repair packets in a multimedia data stream based on the packet loss rate information, decoded-video quality metric, or both.

32. The non-transitory computer-readable storage medium of claim 31, wherein instructions to determine the frequency and placement for positioning the one or more repair packets based on the configuration parameter comprise instructions to:
generate a mapping function between a data rate of the multimedia data stream, a bit rate of the multimedia data stream, a frame rate of the multimedia data stream, a packet loss rate between the transmitting device and the receiving device, a repair packet size, a target latency, a target bandwidth, an upper bound on an encoding complexity, and an upper bound on a decoding complexity; and
determine the frequency for generating one or more repair packets and the placement for positioning the one or more repair packets by optimizing one or more of a latency, a bandwidth, an encoding complexity, and a decoding complexity based on the mapping function.

33. The non-transitory computer-readable storage medium of claim 30, wherein instructions to position the one or more repair packets in source packets of the multimedia data stream comprise instructions to:
compute a bandwidth overhead for placing the one or more repair packets for a given latency based on the priority between a bandwidth and a latency; and
determine the placement for positioning the one or more repair packets at an end of an integral number of pictures based on the computed bandwidth overhead.

34. The non-transitory computer-readable storage medium of claim 30, wherein instructions to position the one or more repair packets in source packets of the multimedia data stream comprise instructions to:
compute a latency for placing the one or more repair packets for given bandwidth based on the priority between a bandwidth and a latency; and
determine the placement for positioning the one or more repair packets at an end of an integral number of pictures based on the computed latency.

* * * * *